United States Patent
Kim et al.

(10) Patent No.: US 10,386,927 B2
(45) Date of Patent: Aug. 20, 2019

(54) METHOD FOR PROVIDING NOTIFICATION AND ELECTRONIC DEVICE THEREOF

(71) Applicant: Samsung Electronics Co., Ltd., Suwon-si, Gyeonggi-do (KR)

(72) Inventors: Hyo-Gil Kim, Yongin-si (KR); Sungwang Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 15/361,247

(22) Filed: Nov. 25, 2016

(65) Prior Publication Data
US 2017/0153705 A1    Jun. 1, 2017

(30) Foreign Application Priority Data

Nov. 26, 2015    (KR) .......................... 10-2015-0166560

(51) Int. Cl.
*G06F 3/041*    (2006.01)
*G06F 3/01*    (2006.01)
(Continued)

(52) U.S. Cl.
CPC ............ *G06F 3/016* (2013.01); *G06F 1/1643* (2013.01); *G06F 1/1694* (2013.01);
(Continued)

(58) Field of Classification Search
CPC .................. G06F 1/1643; G06F 1/1694; G06F 2200/1637; G06F 2203/04104; G06F 3/016; G06F 3/0346; G06F 3/0416
See application file for complete search history.

(56) References Cited

U.S. PATENT DOCUMENTS

| 2013/0234982 A1 | 9/2013 | Kang |
| 2015/0095826 A1* | 4/2015 | Ahn ...................... G06F 3/0488 715/769 |

(Continued)

FOREIGN PATENT DOCUMENTS

| JP | 2011-139258 A | 7/2011 |
| KR | 10-2013-0086025 A | 7/2013 |

(Continued)

OTHER PUBLICATIONS http://www.cnet.com/products/samsung-galaxy-s6-edge.

*Primary Examiner* — Insa Sadio
(74) *Attorney, Agent, or Firm* — Jefferson IP Law, LLP

(57) ABSTRACT

An electronic device and a method for providing notification are provided. The electronic device includes a housing, a touch screen, a communication circuit, an electric motor, a processor electrically coupled to the touch screen, the communication circuit, and the electric motor, and a memory electrically coupled to the processor. The memory stores instructions to be executed by the processor which is configured to control for detecting occurrence of an event from a signal received through the communication circuit or an operation of the electronic device, generating a notification based on at least part of the event, detecting whether at least some areas of the touch screen are touched by a user's hand or finger using the touch screen, and, when the at least some areas of the touch screen are touched by the user's hand or finger, activating the electric motor.

15 Claims, 19 Drawing Sheets

(51) Int. Cl.
*G06F 3/0346* (2013.01)
*G06F 1/16* (2006.01)

(52) U.S. Cl.
CPC .......... *G06F 3/0346* (2013.01); *G06F 3/0416* (2013.01); *G06F 2200/1637* (2013.01); *G06F 2203/04104* (2013.01)

(56) References Cited

U.S. PATENT DOCUMENTS

| | | |
|---|---|---|
| 2015/0206928 A1 | 7/2015 | Kimura et al. |
| 2015/0206943 A1 | 7/2015 | Bobde et al. |

FOREIGN PATENT DOCUMENTS

| | | |
|---|---|---|
| KR | 10-2013-0102298 A | 9/2013 |
| KR | 10-2015-0050077 A | 5/2015 |

* cited by examiner

METHOD FOR PROVIDING NOTIFICATION AND ELECTRONIC DEVICE THEREOF

CROSS-REFERENCE TO RELATED APPLICATION(S)

This application claims the benefit under 35 U.S.C. § 119(a) of a Korean patent application filed on Nov. 26, 2015 in the Korean Intellectual Property Office and assigned Serial number 10-2015-0166560, the entire disclosure of which is hereby incorporated by reference.

TECHNICAL FIELD

The present disclosure relates to a method and an apparatus for providing a notification in an electronic device.

BACKGROUND

As information and communication technology and semiconductor technology have developed, electronic devices have evolved to include various functions to satisfy users' various demands. For example, the electronic devices can provide notification information generated therein to the users using various means such as graphics, sound, light, vibration, or the like. For example, when a notification mode is set to be a sound output mode (for example, a bell sound mode), the electronic device may provide the notification information to the user by outputting a sound. For example, when the notification mode is set to be a silent mode, the electronic device may provide the notification information to the user by lighting a light emitting diode (LED) or outputting a notification screen.

The above information is presented as background information only to assist with an understanding of the present disclosure. No determination has been made, and no assertion is made, as to whether any of the above might be applicable as prior art with regard to the present disclosure.

SUMMARY

The electronic device may provide notification information to the user using a notification means according to the pre-set notification mode. That is, since the electronic device does not consider user's state information such as a user's point of view, a distance between the user and the electronic device, or the like when providing the notification information, there is a problem that the notification information is continuously provided according to the pre-set notification mode even when the user is in a state in which the user is not able to recognize the notification information. For example, the notification mode may include a sound output mode, a vibration mode, a silent mode, or the like.

Aspects of the present disclosure are to address at least the above-mentioned problems and/or disadvantages and to provide at least the advantages described below. Accordingly, an aspect of the present disclosure provides a method and an apparatus for providing notification information in an electronic device in consideration of a user's state.

In accordance with an aspect of the present disclosure, an electronic device is provided. The electronic device includes a housing a touch screen exposed through a part of the housing, a communication circuit disposed inside the housing, an electric motor disposed inside the housing, at least one processor electrically connected with the touch screen, the communication circuit, and the electric motor, and a memory electrically connected with the at least one processor, wherein, when being executed, the memory includes instructions to be executed by the at least one processor. The at least one processor is configured to control for detecting occurrence of an event from a signal received through the communication circuit or an operation of the electronic device, generating a notification based on at least part of the event, detecting whether at least some areas of the touch screen are touched by a user's hand or finger using the touch screen, and, when the at least some areas of the touch screen are touched by the user's hand or finger, activating the electric motor.

In accordance with another aspect of the present disclosure, an electronic device is provided. The electronic device includes a housing, a touch screen exposed through a part of the housing and having at least some areas thereof continuously activated to recognize a touch, a communication circuit disposed inside the housing, an electric motor disposed inside the housing, at least one processor electrically connected with the touch screen, the communication circuit, and the electric motor, and a memory electrically connected with the at least one processor, wherein the memory stores instructions to be executed by the at least one processor. The at least one processor is configured to control for detecting occurrence of an event from a signal received through the communication circuit or an operation of the electronic device, generating a notification based on at least part of the event, detecting whether at least some areas of the touch screen are touched by a user's hand or finger using the touch screen, and, when the at least some areas of the touch screen are touched by the user's hand or finger, activating the electric motor.

In accordance with another aspect of the present disclosure, an operation method of an electronic device is provided. The operation method includes detecting occurrence of an event from a signal received from an external electronic device or an operation of the electronic device, generating a notification based on at least part of the event, detecting whether at least some areas of a touch screen functionally connected with the electronic device are touched by a user's hand or finger, and, when the at least some areas of the touch screen are touched by the user's hand or finger, activating an electric motor functionally connected with the electronic device.

In accordance with another aspect of the present disclosure, an operation method of an electronic device is provided. The operation method includes detecting occurrence of an event from a signal received from an external electronic device or an operation of the electronic device, generating a notification based on at least part of the event, continuously detecting whether at least some areas of a touch screen functionally connected with the electronic device are touched by a user's hand or finger, and, when the at least some areas of the touch screen are touched by the user's hand or finger, activating an electric motor functionally connected with the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
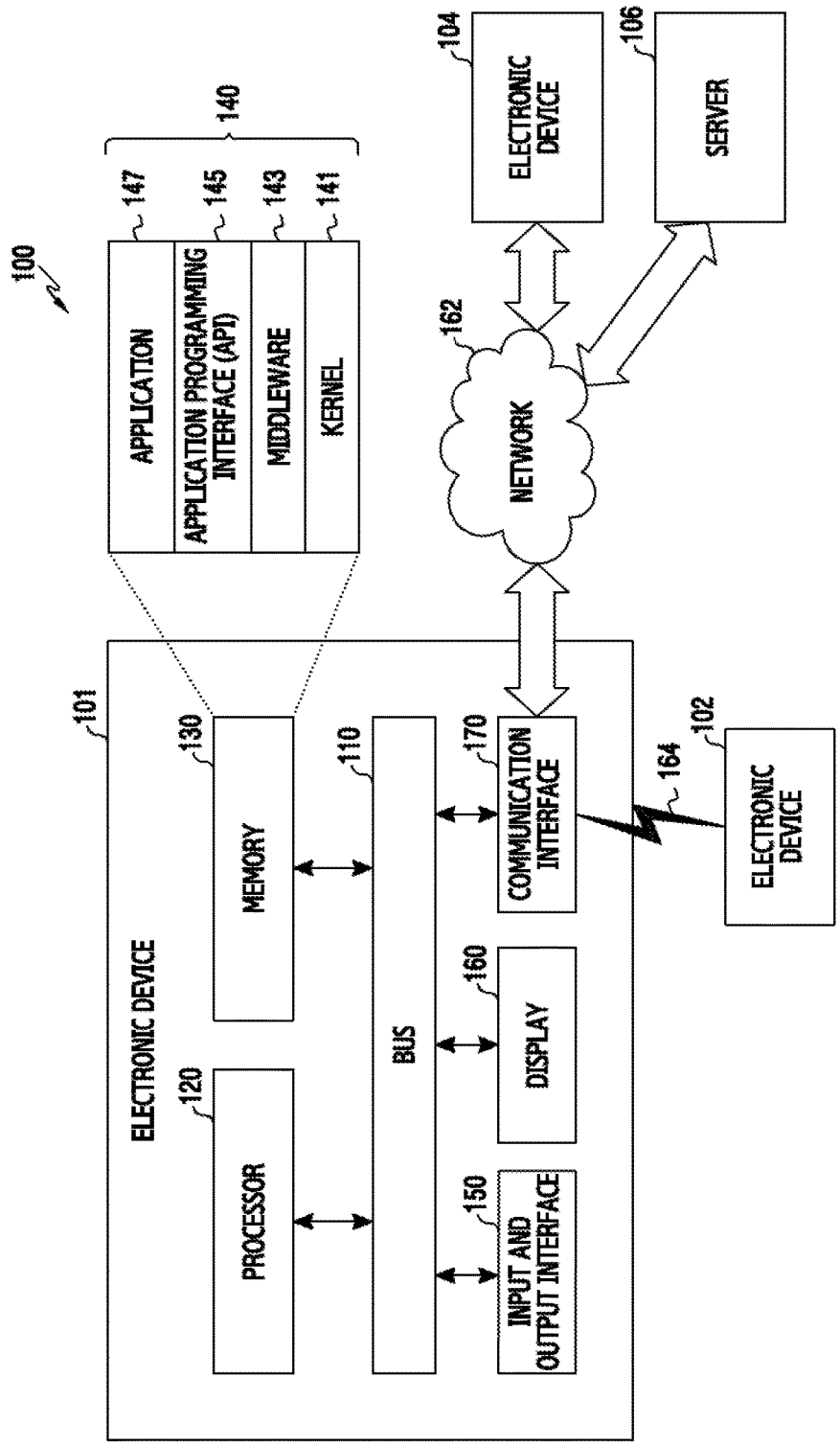
FIG. 1 illustrates a view showing a network environment including an electronic device according to various exemplary embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 within a network environment 100, according to various embodiments, will be described with reference to FIG. 1. The electronic device 101 may include a bus 110, a processor 120, a memory 130, an input/output interface 150, a display 160, and a communication interface 170. According to an embodiment of the present disclosure, the electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display or plastic OLED (POLED), a microelectromechanical systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wireless Fidelity (Wi-Fi), Bluetooth (BT), near field communication (NFC), and global navigation satellite system (GNSS). GNSS may include, for example, at least one of global positioning system (GPS), global navigation satellite system (Glonass), Beidou Navigation satellite system (Beidou) or Galileo, and the European global satellite-based navigation system, based on a location, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), Recommended Standard 232 (RS-232), and a plain old telephone service (POTS). The network 162 may include at least one of a telecommunication network such as a computer network (e.g., a LAN or a WAN), the Internet, and a telephone network.

With reference to FIG. 1, each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
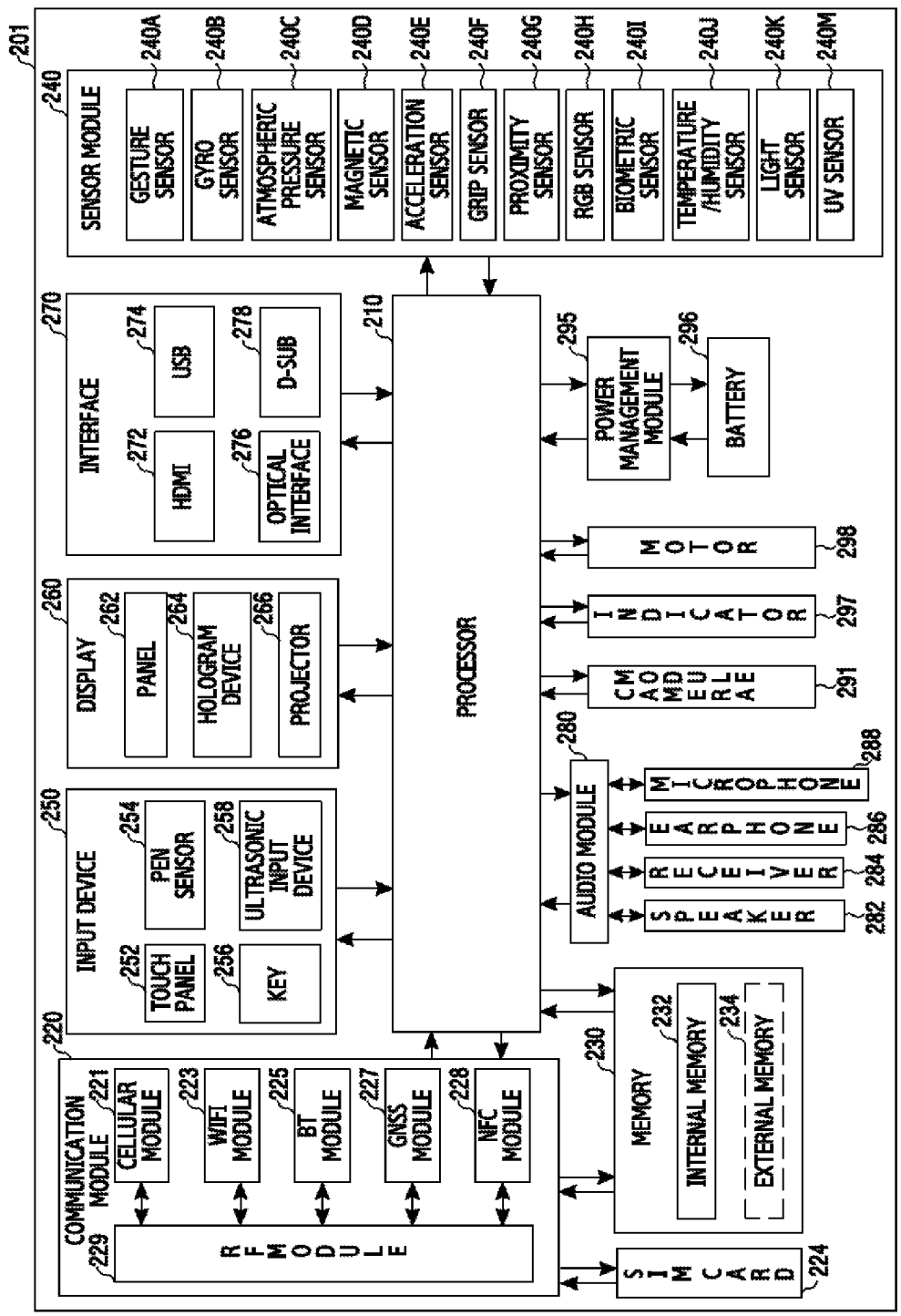
FIG. 2 illustrates a block diagram showing an electronic device according to various exemplary embodiments of the present disclosure.

FIG. 2 is a block diagram of an electronic device according to various embodiments of the present disclosure.

Referring to FIG. 2, the electronic device 201 may include, for example, all or a part of the electronic device 101 shown in FIG. 1. The electronic device 201 may include one or more processors 210 (e.g., AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 shown in FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a CP.

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an embedded or internal memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an eXtreme Digital (xD), a multi-media-card (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and an ultra violet (UV) sensor 240M. Additionally or alternatively, the sensor module 240 may include, for example, an olfactory sensor or electronic nose (E-nose) sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a digital stylus or (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a SD card/MMC interface, or an infrared data association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an image signal processor (ISP) or a flash (e.g., LED or xenon lamp).

The power management module 295 may manage, for example, power of the electronic device 201. According to an embodiment of the present disclosure, the power management module 295 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. In various embodiments, the electronic device may include at least one of the above-described elements. Some of the above-described elements may be omitted from the electronic device, or the electronic device may further include additional elements. In addition, some of the hardware components according to various embodiments may be combined into one entity, which may perform functions identical to those of the relevant components before the combination.

Figure 3:
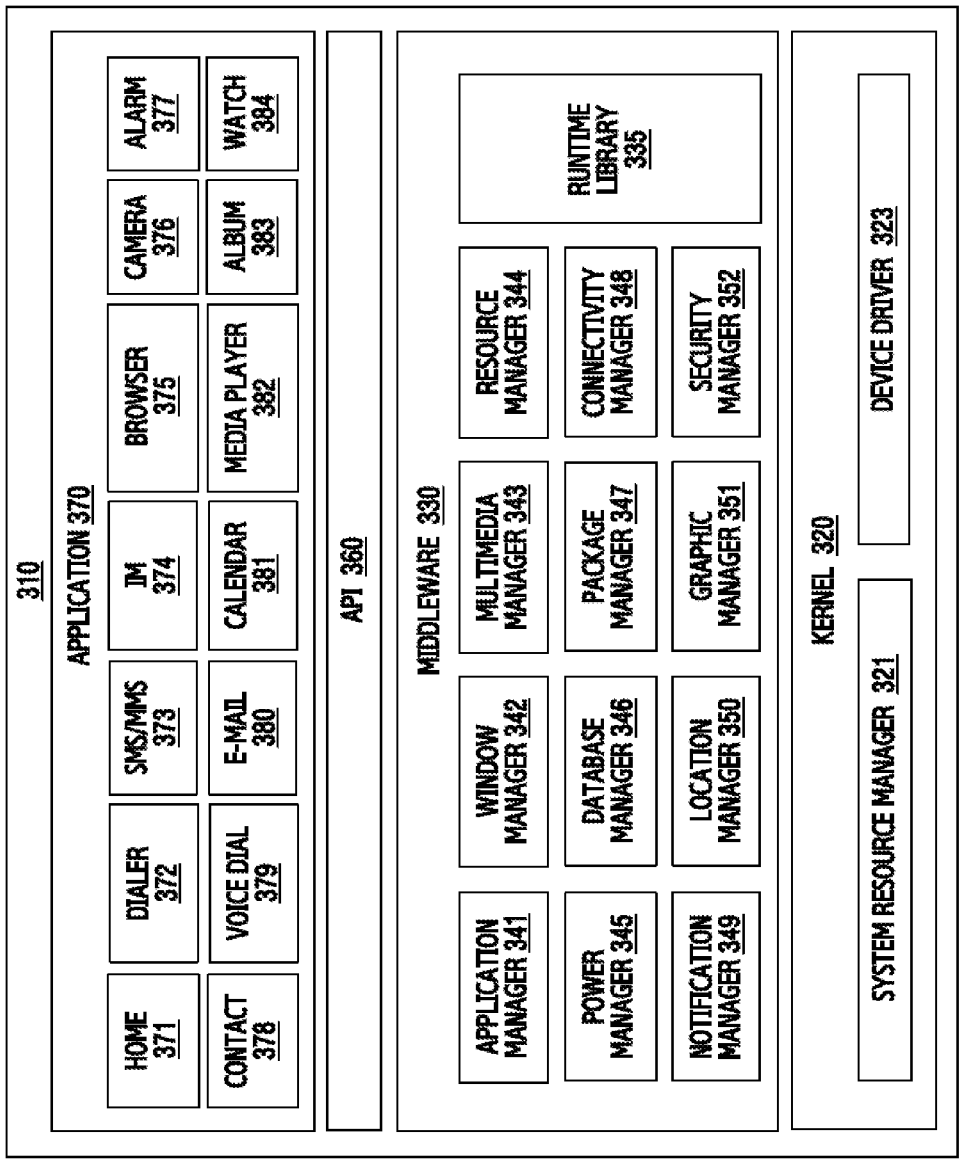
FIG. 3 illustrates a block diagram showing a program according to various exemplary embodiments of the present disclosure.

FIG. 3 is a block diagram of a program module according to various embodiments of the present disclosure.

Referring to FIG. 3, according to an embodiment of the present disclosure, the program module 310 (e.g., the program 140 shown in FIG. 1) may include an operating system (OS) for controlling resources related to the electronic device (e.g., the electronic device 101) and/or various applications (e.g., the application programs 147) executed in the operating system. The operating system may be, for example, Android™, iOS™, Windows™, Symbian®, Tizen®, Bada®, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106, shown in FIG. 1).

The kernel 320 (e.g., the kernel 141 shown in FIG. 1) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

Referring to FIG. 3, the application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145 shown in FIG. 1) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147 shown in FIG. 1) may include, for example, one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101 shown in FIG. 1) and an external electronic device (e.g., the electronic device 102 or 104 shown in FIG. 1). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 120 and 210 shown in FIGS. 1 and 2).

At least some of the program module 310 may include, for example, a module, a program, a routine, a set of instructions, and/or a process for performing one or more functions.

Figure 4:
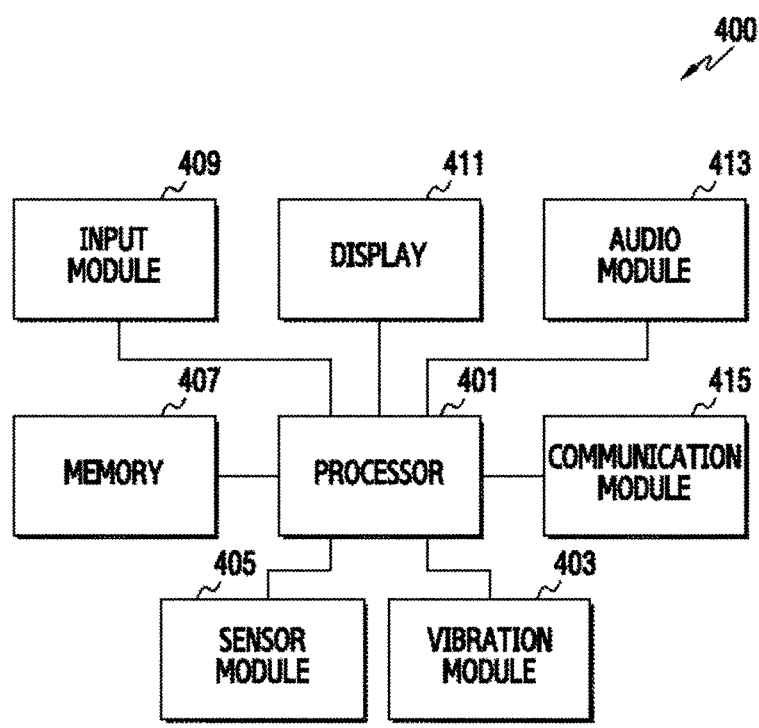
FIG. 4 illustrates a block diagram showing an electronic device according to various exemplary embodiments of the present disclosure.

FIG. 4 illustrates a block diagram showing an electronic device according to various exemplary embodiments of the present disclosure. In the following description, the electronic device 400 may constitute the entirety or a part of the electronic device 101 shown in FIG. 1 or the electronic device 201 shown in FIG. 2.

Referring to FIG. 4, the electronic device 400 may include a processor 401, a vibration module 403, a sensor module 405, a memory 407, an input module 409, a display 411, an audio module 413, and a communication module 415.

The processor 401 may detect a notification event which is generated by a signal received through the communication module 415 or an operation of the electronic device 400. For example, when a call is received through the communication module 415, the processor 401 may determine that the notification event occurs. In another example, when a text message is received through the communication module 415, the processor 401 may determine that the notification event occurs. In another example, the processor 401 may detect the notification event based on drive information of an application on the electronic device 400. For example, when an alarm time set in a schedule application is reached, the processor 401 may determine that the notification event occurs. For example, when an error of an application occurs, the processor 401 may determine that the notification event occurs.

According to an embodiment, when the notification event is detected, the processor 401 may generate notification information corresponding to a notification mode of the electronic device. For example, when a call is received in a sound output mode, the processor 401 may extract bell sound data corresponding to the received call from the memory 407. In another example, when a text message is received in a silent mode, the processor 401 may extract a notification screen corresponding to the received message from the memory 407, or generate a notification screen corresponding to the received message.

According to an embodiment, when the notification event is detected, the processor 401 may determine whether a user grips the electronic device 400 or not based on touch information on the display 411 (for example, a touch screen). For example, when a touch input is detected on at least some areas of the display 411, the processor 401 may determine that the electronic device 400 is gripped by the user. In another example, when a touch input is held on at least some areas of the display 411 during more than a reference time, the processor 401 may determine that the electronic device 400 is gripped by the user. For example, the touch input on the at least some areas of the display 411 may include a touch input which is made by a user's hand or finger. For example, the at least some areas of the display 411 on which the touch input is detected may include a part of an edge of the display 411.

According to an embodiment, when the user's grip on the electronic device 400 is detected, the processor 401 may output a vibration corresponding to the notification information. For example, when a call reception event occurs in a state in which the electronic device 400 is set in the sound output mode, the processor 401 may determine whether the electronic device 400 is gripped by the user or not. When the user's grip on the electronic device 400 is detected, the processor 401 may output a vibration corresponding to a bell sound in the sound output mode. For example, when the user's grip on the electronic device 400 is released while the vibration is being outputted, the processor 401 may output the bell sound. In another example, when the electronic device 400 receives a text message in the silent mode, the processor 401 may determine whether the electronic device 400 is gripped by the user or not. When the user's grip on the electronic device 400 is detected, the processor 401 may output a vibration corresponding to a light output (for example, lighting of an LED) in the silent mode.

According to an embodiment, when the user's grip on the electronic device 400 is not detected, the processor 401 may provide the notification information to the user through a notification means according to a notification mode of the electronic device 400. For example, when the call is received in the sound output mode and the user's grip is not detected, the processor 401 may output a bell sound. In another example, when the text message is received in the silent mode and the user's grip is not detected, the processor 401 may output light. Additionally or alternatively, the processor 401 may determine whether the electronic device 400 is gripped by the user or not based on touch information on the display 411 while providing the notification information. When the user's grip on the electronic device 400 is detected, the processor 401 may output the vibration corresponding to the notification information.

According to an embodiment, the processor 401 may perform a function corresponding to the notification event based on motion information of the electronic device 400 while providing the notification information. For example, the processor 401 may acquire motion information of the electronic device 400 while outputting the notification information according to the received call through a sound or a vibration in the sound output mode. The processor 401 may automatically accept call connection based on the motion information of the electronic device 400. Additionally or alternatively, the processor 401 may additionally consider proximity information acquired through a proximity sensor, and may automatically determine whether to accept the call connection or not. In another example, the processor 401 may acquire motion information of the electronic device 400 while outputting the notification information according to the received text message through the light or vibration in the silent mode. The processor 401 may automatically output the text message to the display 411 based on the motion information of the electronic device 400.

According to an embodiment, the processor 401 may provide unidentified notification information based on a user's touch input on the display 411. For example, the processor 401 may control to arrange the unidentified notification information based on priority of the notification information and output the unidentified notification information to the display 411. For example, the priority of the notification information may be fixed or may be updated according to the number of times of execution, a point of time of execution, an execution time, or the like.

When the notification event is detected, the vibration module 403 (for example, an electric motor) may output a vibration corresponding to the notification information based on whether the electronic device 400 is gripped by the user or not. For example, when a call is received in the sound output mode of the electronic device 400 and a user's grip on the electronic device 400 is detected, the vibration module 403 may output a vibration corresponding to a bell sound under the control of the processor 401. In another example, when a text message is received in the silent mode and a user's grip on the electronic device 400 is detected, the vibration module 403 may output a vibration corresponding to a light output under the control of the processor 401.

According to an embodiment, when the user's grip on the electronic device 400 is detected while the notification information corresponding to the notification event is being provided based on the notification mode of the electronic device, the vibration module 403 may output a vibration corresponding to the notification information. For example, when a user's touch input on at least some areas of the display 411 is detected while a bell sound is being outputted according to a received call in the sound output mode, the vibration module 403 may output a vibration under the control of the processor 401. In another example, when a user's touch input on at least some areas of the display 411 is detected while light is being outputted according to a received text message in the silent mode, the vibration module 403 may output a vibration under the control of the processor 401.

The sensor module 405 may acquire motion information and proximity information of the electronic device 400. For example, the sensor module 405 may include an acceleration sensor, an ultrasonic sensor, a gyro sensor, a geomagnetic sensor, a proximity sensor, or the like. For example, the sensor module 405 may further include a control circuit to control at least one sensor included in the sensor module 405.

The memory 407 may store commands or data for driving the electronic device 400. For example, the memory 407 may store reference information for executing a function corresponding to a notification event based on motion information of the electronic device 400 which is acquired through the sensor module 405. For example, the memory 407 may store first motion information for accepting call connection while outputting notification information according to a received call through a sound or a vibration in the sound output mode. For example, the memory 407 may store second motion information for identifying a text message while outputting notification information according to a received text message through light or a vibration in the silent mode. In another example, the memory 407 may store an application. For example, the memory 407 may store an operating system, a game application, a social application, a schedule application, or the like.

The input module 409 may forward a command or information for controlling the operation of the electronic device 400, which is inputted from the user or another external electronic device, to the other element(s) of the electronic device 400. For example, the input module 406 may include a key pad, a dome switch, a physical button, a touch pad (resistive/capacitive), a jog & shuttle, or the like.

The display 411 may include a liquid crystal display (LCD), a light emitting diode (LED) display, an organic LED (OLED) display or a plastic OLED (POLED), a micro electro mechanical system (MEMS) display, an electronic paper display, and a touch screen.

According to an embodiment, at least some areas of the display 411 may continuously detect a user's touch input. For example, the display 411 may detect a user's touch input on the edge area of the display 411 when the screen is turned off.

The audio module 413 may convert an electric signal into a sound. For example, the audio module 413 may process sound information which is outputted through a speaker, a receiver, an earphone, or the like.

The communication module 415 (or a communication circuit) performs communication in the electronic device 400. In this case, the communication module 415 may communicate with an external electronic device in various methods. For example, the communication module 410 may communicate with the external electronic device using long term evolution (LTE), wideband code division multiple access (WCDMA), global system for mobile communications (GSM), wireless fidelity (WiFi), Bluetooth, and near field communications (NFC).

According to various embodiments of the present disclosure, the electronic device 400 may further include a camera module (not shown). For example, the camera module may perform a function of collecting images by photographing a subject. For example, the camera module may be activated according to a signal which is generated in the input module 409 or the display 411 (for example, a touch screen), and may collect images. For example, the camera module may include an image sensor. For example, the image sensor may include a charge-coupled device (CCD) sensor, a complementary metal-oxide semiconductor (CMOS) sensor, or the like.

According to an embodiment, the processor 401 may detect a point of view of the user using the camera module. The processor 401 may determine whether the user is in a state in which the user can identify identification information based on the user's point of view. For example, when the user's point of view is toward the display 411 in the silent mode, the processor 401 may determine that the user is in the state in which the user can identify the notification information. In another example, when the user's point of view is not toward the display 411 in the silent mode, the processor 401 may determine that the user is in the state in which the user cannot identify the notification information.

According to an embodiment, the processor 401 may determine whether the user is in the state in which the user can identify the notification based on a drive state of an application. For example, when at least one application which is being driven in the electronic device 400 performs a function corresponding to a user's command, the processor 401 may determine that the user is in the state in which the user can identify the notification. In another example, when at least one application which is being driven in the electronic device 400 is in a standby state, the processor 401 may determine that the user is in the state in which the user cannot identify the notification. Herein, the user's command may include a key input, a voice input, motion detection, or the like.

According to various embodiments of the present disclosure, an electronic device may include: a housing; a touch screen exposed through a part of the housing; a communication circuit disposed inside the housing; an electric motor disposed inside the housing; a processor electrically connected with the touch screen, the communication circuit, and the electric motor; and a memory electrically connected with the processor. When being executed, the memory may include instructions for the processor to: detect occurrence of an event from a signal received through the communication circuit or an operation of the electronic device; generate a notification based on at least part of the event; detect whether at least some areas of the touch screen are touched by a user's hand or finger using the touch screen; and, when the at least some areas of the touch screen are touched by the user's hand or finger, activate the electric motor.

According to various embodiments of the present disclosure, the instructions may further include at least one instruction for the processor to activate the electric motor related to the notification immediately after generating the notification.

According to various embodiments of the present disclosure, the instructions may further include at least one instruction for the processor to, when the at least some areas of the touch screen are not touched by the user's hand or finger, output the notification, and, when a touch input made by the user's hand or finger is detected while the notification is being outputted, activate the electric motor.

According to various embodiments of the present disclosure, the instructions may further include at least one instruction for the processor to, when the touch made by the user's hand or finger on the at least some areas of the touch screen is held during a reference time, activate the electric motor.

According to various embodiments of the present disclosure, the instructions may further include at least one instruction for the processor to, when the at least some areas of the touch screen are touched by the user's hand or finger, determine whether it is possible to identify the notification based on a user's point of view, and, when it is determined that it is possible to identify the notification, activate the electric motor.

According to various embodiments of the present disclosure, the instructions may further include at least one instruction for the processor to, when the at least some areas of the touch screen are touched by the user's hand or finger, determine whether it is possible to identify the notification based on a state of at least one application which is being driven in the electronic device, and, when it is determined that it is possible to identify the notification, activate the electric motor.

According to various embodiments of the present disclosure, the touch screen may continuously determine whether the touch made by the user's hand or finger is detected or not.

According to various embodiments of the present disclosure, the instructions may further include at least one instruction for the processor to, when the electric motor is activated, detect motion information of the electronic device, and perform a function corresponding to the occurrence of the event based on the motion information.

According to various embodiments of the present disclosure, an electronic device may include: a housing; a touch screen exposed through a part of the housing and having at least some areas thereof continuously activated to recognize a touch; a communication circuit disposed inside the housing; an electric motor disposed inside the housing; a processor electrically connected with the touch screen, the communication circuit, and the electric motor; and a memory electrically connected with the processor. When being executed, the memory may include instructions for the processor to: detect occurrence of an event from a signal received through the communication circuit or an operation of the electronic device; generate a notification based on at least part of the event; detect whether at least some areas of the touch screen are touched by a user's hand or finger using the touch screen; and, when the at least some areas of the touch screen are touched by the user's hand or finger, activate the electric motor.

Figure 5:
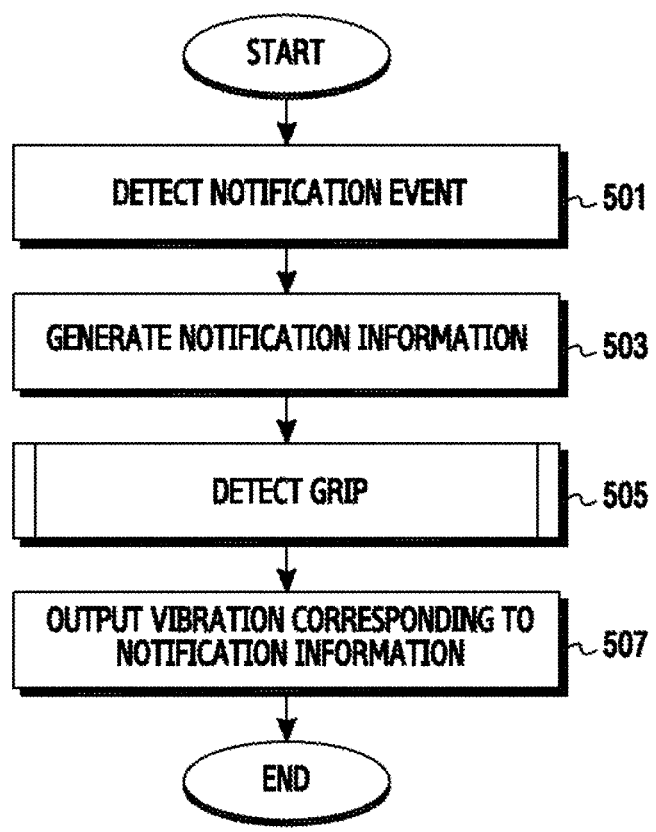
FIG. 5 illustrates a flowchart for providing notification information in an electronic device according to various exemplary embodiments of the present disclosure.

FIG. 5 illustrates a flowchart for providing notification information in an electronic device according to various exemplary embodiments of the present disclosure.

Referring to FIG. 5, in operation 501, the electronic device (for example, the electronic device 101, 201, or 400, shown in FIGS. 1 and 4) may detect a notification event according to driving of the electronic device. For example, with reference to FIG. 4, when a call or a text message is received through the communication module 415, the processor 401 may determine that the notification event occurs. In another example, the processor 401 may detect a notification event based on drive information of an application.

For example, when an alarm time set in a schedule application which is being driven is reached, the processor 401 may determine that the notification event occurs. For example, when an error occurs in an application which is being driven in the electronic device 400, the processor 401 may determine that the notification event occurs.

In operation 503, the electronic device may generate notification information corresponding to the notification event based on a notification mode of the electronic device. For example, when a call is received through the communication module 415 in a sound output mode, the processor 401 may extract a bell sound corresponding to the received call from the memory 407. In another example, when a text message is received through the communication module 415 in the sound output mode, the processor 401 may extract a text message notification sound corresponding to the received text from the memory 407. In another example, when an alarm time set in a schedule application which is being driven in the electronic device 400 is reached in a silent mode, the processor 401 may extract an alarm screen corresponding to the alarm of the application from the memory 407.

In operation 505, the electronic device may detect a user's grip on the electronic device based on touch information on at least some areas of the display (for example, a touch screen). For example, when the notification event is detected, the processor 401 may detect a touch input made by a user's hand or finger on at least some areas of the display 411. When the touch input made by the user's hand or finger is detected on at least some areas of the display 411, the processor 401 may determine that the electronic device 400 is gripped by the user. For example, the at least some areas of the display 411 may include a part of the edge of the display 411.

In operation 507, when the user's grip on the electronic device is detected, the electronic device may output a vibration corresponding to the notification information. For example, when the user's grip on the electronic device 400 is detected in the sound output mode, the processor 401 may output a vibration corresponding to the bell sound according to the received call. In another example, when the user's grip on the electronic device 400 is detected in the sound output mode, the processor 401 may output a vibration corresponding to the text message notification sound. In another example, when the user's grip on the electronic device 400 is detected in the silent mode, the processor 401 may output a vibration corresponding to the notification screen of the application.

Figure 6:
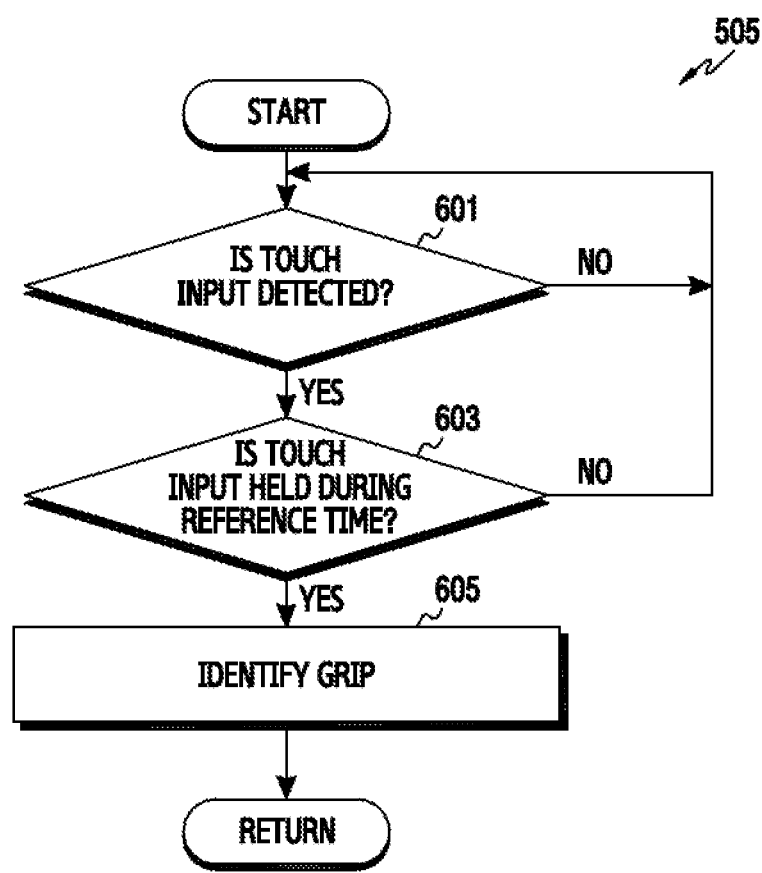
FIG. 6 illustrates a flowchart for detecting a user's grip on an electronic device in the electronic device according to various exemplary embodiments of the present disclosure.

FIG. 6 illustrates a flowchart for identifying a user's grip on an electronic device in the electronic device according to various exemplary embodiments of the present disclosure. Hereinafter, the operation of detecting the user's grip on the electronic device in operation 505 of FIG. 5 will be described with reference to FIGS. 7A and 7B.

Figure 7A:
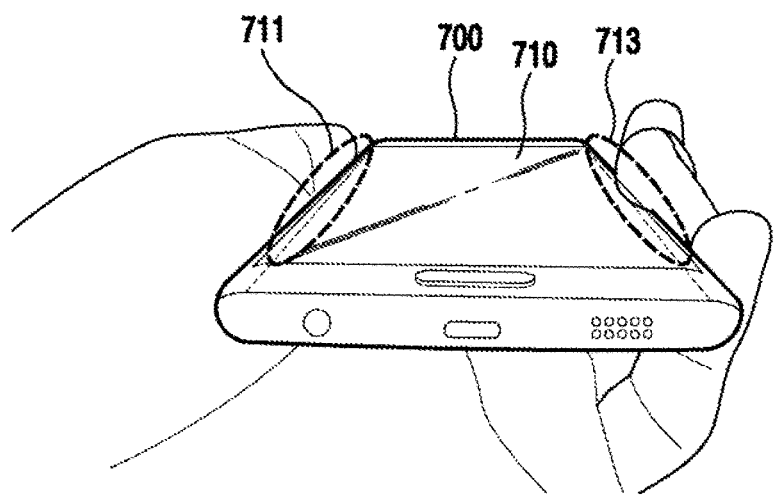
FIGS. 7A and 7B illustrate views showing an electronic device which is gripped by a user according to various exemplary embodiments of the present disclosure.
Figure 7B:
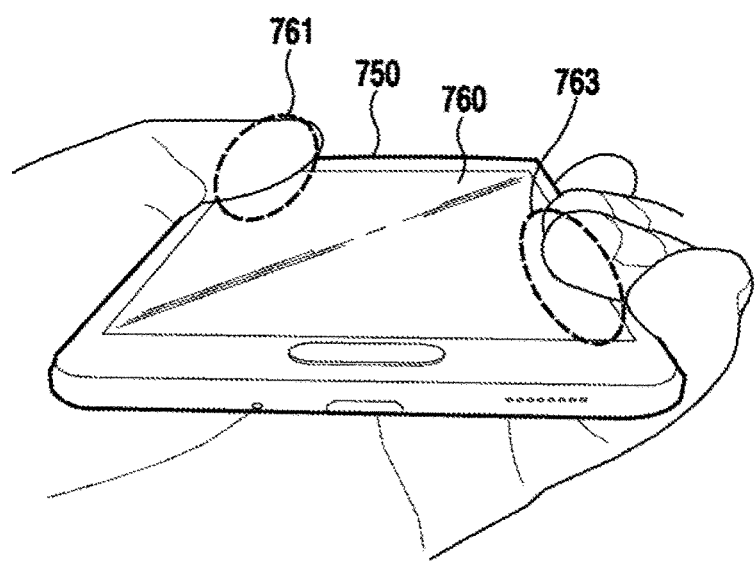

Referring to FIG. 6, in operation 601, when a notification event is detected (for example, operation 501 of FIG. 5), the electronic device (for example, the electronic device 101, 201, or 400 shown in FIG. 1 or 4) may determine whether a user's touch input on at least some areas of the display (for example, a touch screen) is detected or not. For example, as shown in FIG. 7A, an electronic device 700 may determine whether a first touch input 711 and a second touch input 713 made by user's fingers are detected on an edge area of an edge-panel display 710. In another example, as shown in FIG. 7B, an electronic device 750 may determine whether a third touch input 761 and a fourth touch input 763 made by user's fingers are detected on an edge area of a flat-panel display 760.

When the touch input is not detected, the electronic device may continuously or periodically determine whether a user's touch input on at least some areas of the display is detected or not in operation 601. For example, the processor 401 may determine whether a touch input made by a user's hand or finger is detected continuously during the time that notification information is being outputted.

In operation 603, the electronic device may determine whether the user's touch input on the at least some areas of the display is held during a reference time. For example, the electronic device 700 may determine whether at least one of the user's first touch input 711 and the user's second touch input 713 on the at least some areas of the edge-panel display 710 is held during the reference time or not. In another example, the electronic device 750 may determine whether at least one of the user's third touch input 761 and the user's fourth touch input 763 on the at least some areas of the flat-panel display 760 is held during the reference time or not. Herein, the reference time is a time for determining whether the electronic device is gripped by the user or not, and may be changed by the user.

In operation 605, when it is determined that the user's touch input is held during the reference time, the electronic device may determine that the electronic device is gripped by the user. For example, when it is determined that at least one of the user's first touch input 711 and the user's second touch input 713 on the edge area of the edge-panel display 710 is held during the reference time, the electronic device 700 may determine that the electronic device 700 is gripped by the user. In another example, when it is determined that at least one of the third touch input 761 and the fourth touch input 763 on the edge area of the flat-panel display 760 is held during the reference time, the electronic device 750 may determine that the electronic device 750 is gripped by the user.

According to an embodiment, the electronic device may determine whether the electronic device is gripped by the user or not using a user's touch input on the display (for example, a touch screen). Accordingly, a touch recognition function of the display may be continuously activated regardless of an operation state of the display, or may be activated when a notification event is detected. For example, even when the display is turned off, the electronic device 700 may detect the touch input made by the user's hand or finger through at least some areas of the edge-panel display 710. In another example, even when the screen is turned off, the electronic device 750 may detect the touch input made by the user's hand or finger on at least some areas of the flat-panel display 760.

Figure 8:
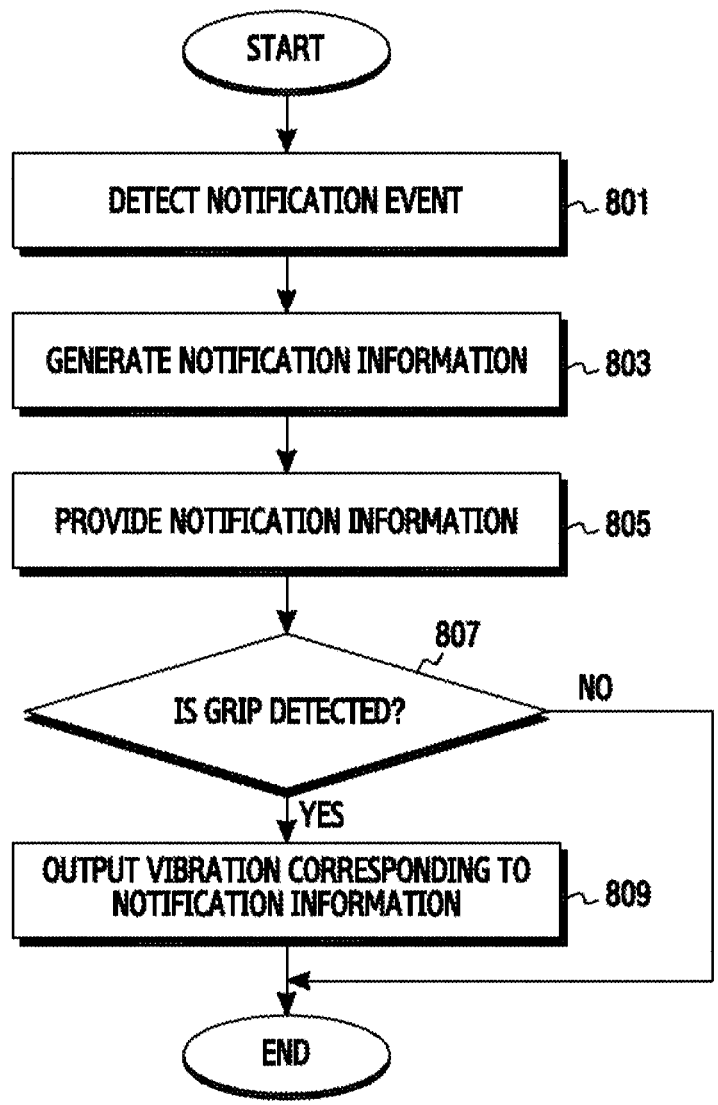
FIG. 8 illustrates a flowchart for providing notification information in an electronic device according to various exemplary embodiments of the present disclosure.

FIG. 8 illustrates a flowchart for providing notification information in an electronic device according to an embodiment of the present disclosure.

Referring to FIG. 8, in operation 801, the electronic device (for example, the electronic device 101, 201, or 400 shown in FIG. 1 or 4) may detect a notification event according to driving of the electronic device. For example, when a call is received through the communication module 415, the processor 401 may determine that the notification event occurs. In another example, when a text message is received through the communication module 415, the processor 401 may determine that the notification event occurs.

In operation 803, the electronic device may generate notification information corresponding to the notification event based on a notification mode of the electronic device.

For example, when a call is received through the communication module 415 in a silent mode, the processor 401 may extract a call reception screen corresponding to the received call from the memory 407. In another example, when a text message is received through the communication module 415 in the silent mode, the processor 401 may extract a text message notification screen corresponding to the received text from the memory 407. In another example, when an alarm time set in a schedule application which is being driven in the electronic device 400 is reached in a sound output mode, the processor 401 may extract an alarm sound corresponding to the alarm of the application from the memory 407.

In operation 805, the electronic device may provide the notification information corresponding to the notification event based on the notification mode of the electronic device. For example, when a call is received in the sound output mode, the processor 401 may output a bell sound corresponding to the received call. In another example, when a text message is received in the sound output mode, the processor 401 may output a text message notification sound corresponding to the text message. In another example, when an alarm time set in the schedule application is reached in the sound output mode, the processor 401 may output an alarm sound corresponding to the alarm.

In operation 807, the electronic device may determine whether a user's grip on the electronic device is detected or not while providing the notification information. For example, with reference to FIG. 4, the processor 401 may determine whether a user's touch input on at least some areas of the display 411 is detected or not while outputting the bell sound corresponding to the received call in the sound output mode. In another example, the processor 401 may determine whether a user's touch input on at least some areas of the display 411 is detected or not while outputting the text message notification sound corresponding to the received text message in the sound output mode. In another example, the processor 401 may determine whether a user's touch input on at least some areas of the display 411 is detected or not while outputting the alarm sound corresponding to the alarm set in the schedule application in the silent mode.

In operation 809, when the user's grip on the electronic device is detected, the electronic device may output a vibration corresponding to the notification information. For example, when the user's grip on the electronic device 400 is detected in the silent mode, the processor 401 may output a vibration corresponding to the call reception screen according to the received call. In another example, when the user's grip on the electronic device 400 is detected in the silent mode, the processor 401 may output a vibration corresponding to the text message notification screen. In another example, when the user's grip on the electronic device 400 is detected in the sound output mode, the processor 401 may output a vibration corresponding to the alarm sound of the application.

Figure 9:
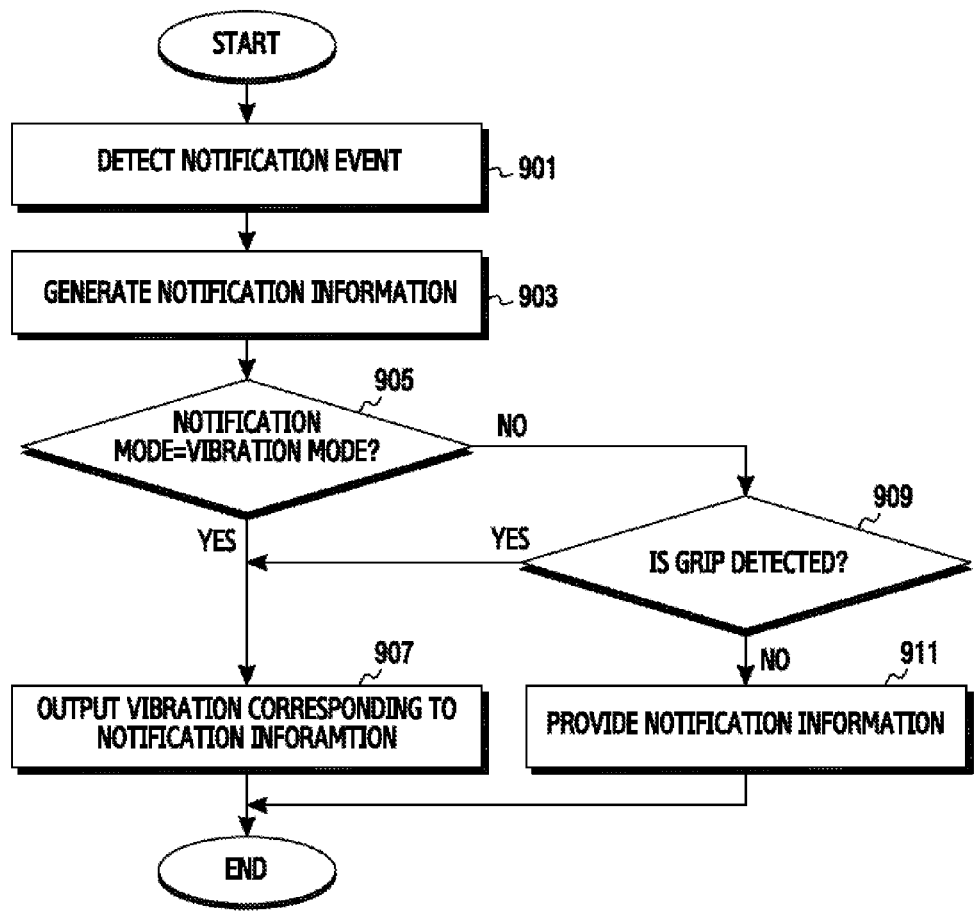
FIG. 9 illustrates a flowchart for providing notification information in an electronic device according to various exemplary embodiments of the present disclosure.

FIG. 9 illustrates a flowchart for providing notification information in an electronic device according to various exemplary embodiments of the present disclosure.

Referring to FIG. 9, in operation 901, the electronic device (for example, the electronic device 101, 201, or 400 shown in FIG. 1 or 4) may detect a notification event according to driving of the electronic device. For example, the processor 401 may detect a notification event occurring in an application which is being driven in the electronic device 400. For example, when an error occurs according to driving of the application which is being driven in the electronic device 400, the processor 401 may determine that the notification event occurs.

In operation 903, when the notification event is detected, the electronic device may generate notification information. For example, with reference to FIG. 4, when an alarm time set in a schedule application which is being driven in the electronic device 400 is reached in a silent mode, the processor 401 may extract a light output pattern corresponding to the alarm of the application from the memory 407. Herein, the light output pattern may include color of light to be outputted, a period during which light is outputted, brightness of light, or the like.

In operation 905, the electronic device may determine whether the notification mode of the electronic device is a vibration mode or not. Herein, the vibration mode may include a mode in which the notification information corresponding to the notification event is provided with a vibration or a vibration corresponding to the notification information is provided.

In operation 907, when the notification mode of the electronic device is the vibration mode, the electronic device may output a vibration corresponding to the notification information. For example, when the notification mode of the electronic device is the vibration mode, the processor 401 may output a vibration corresponding to the error which occurs according to driving of the application. In another example, when the notification mode of the electronic device is the vibration mode, the processor 401 may output a vibration according to the alarm of the schedule application.

In operation 909, when the notification mode of the electronic device is not the vibration mode, the electronic device may detect a user's grip on the electronic device. For example, the processor 401 may determine whether a user's touch input on at least some areas of the display 411 is detected or not while receiving a request for call connection in a sound output mode. In another example, when a text message is received in the sound output mode, the processor 401 may determine whether a user's touch input on at least some areas of the display 411 is detected or not. For example, when the user's touch input on the at least some areas of the display 411 is detected, the processor 401 may determine that the electronic device 400 is gripped by the user. For example, when a touch input made by a user's hand or finger is detected, the processor 401 may determine that the electronic device 400 is gripped by the user and perform operation 907 to output the vibration corresponding to the notification information.

When the grip on the electronic device is detected, the electronic device may output the vibration corresponding to the notification information in operation 907. For example, when the user's grip on the electronic device 400 is not detected in the sound output mode, the processor 401 may output a vibration corresponding to a bell sound according to a received call. In another example, when the user's grip on the electronic device 400 is not detected in the silent mode, the processor 401 may output a vibration corresponding to the text message notification screen according to the received text message.

In operation 911, when the user's grip on the electronic device is not detected, the electronic device may provide the notification information corresponding to the notification event based on the notification mode of the electronic device. For example, when the user's grip on the electronic device 400 is not detected in the silent mode, the processor 401 may output a call reception screen corresponding to the received call. In another example, when the user's grip on the electronic device 400 is not detected in the silent mode, the processor 401 may output light corresponding to the received text message.

Figure 10:
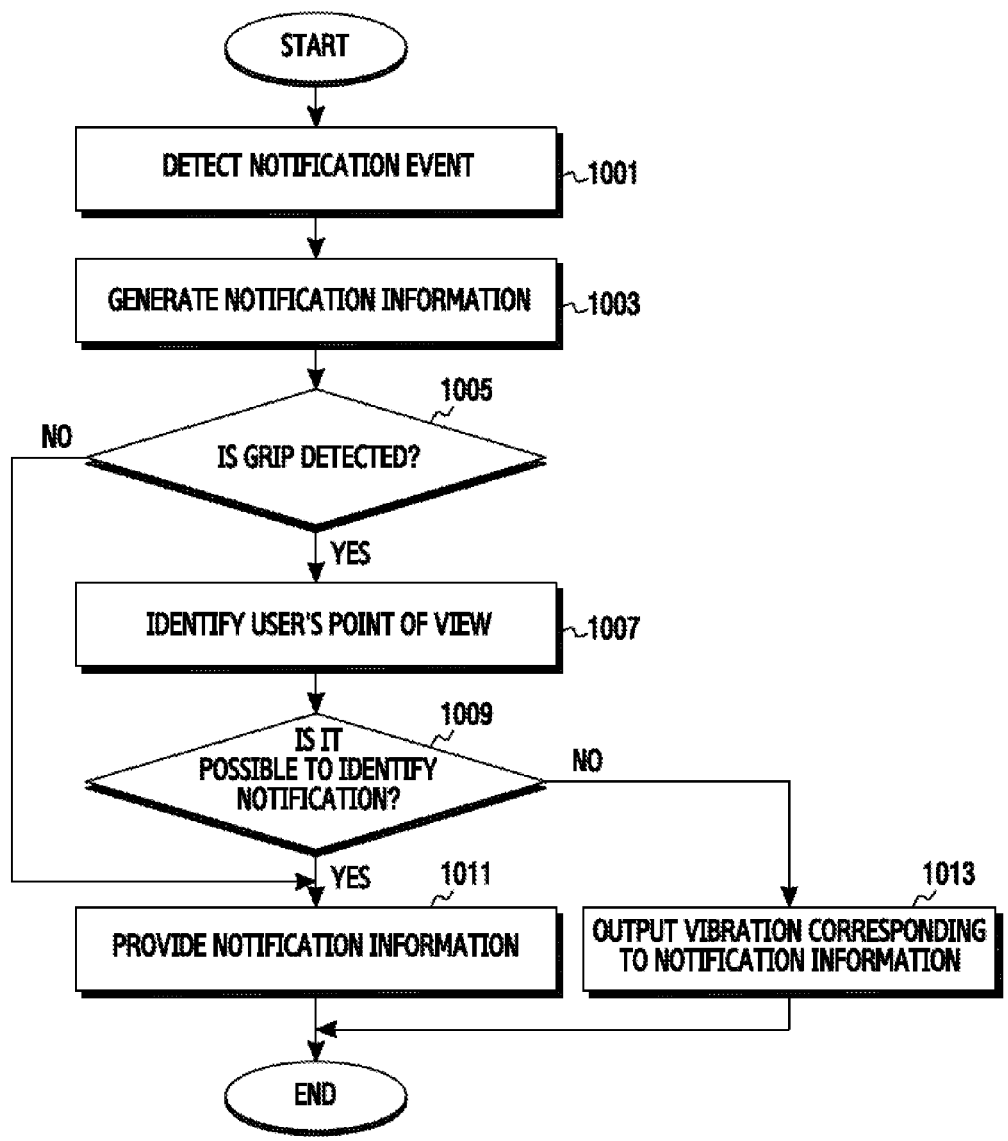
FIG. 10 illustrates a flowchart for providing notification information in an electronic device according to various exemplary embodiments of the present disclosure.

FIG. 10 illustrates a flowchart for providing notification information in an electronic device according to various exemplary embodiments of the present disclosure.

Referring to FIG. 10, in operation S1001, the electronic device (for example, the electronic device 101, 201, or 400 shown in FIG. 1 or 4) may detect a notification event according to driving of the electronic device. For example, when a signal (for example, a call, a text message, or the like) is received through the communication module 415, the processor 401 may determine that the notification event occurs. In another example, when an error occurs in an operating system which is being driven in the electronic device 400, the processor 401 may determine that the notification event occurs.

In operation 1003, the electronic device may generate notification information corresponding to the notification event in a notification mode of the electronic device. For example, when a call is received through the communication module 415 in a sound output mode, the processor 401 may extract a call reception screen corresponding to the received call from the memory 407. In another example, when an alarm time set in a schedule application which is being driven in the electronic device 400 is reached in the sound output mode, the processor 401 may extract an alarm screen corresponding to the alarm of the application from the memory 407.

In operation 1005, the electronic device may detect a user's grip on the electronic device based on a touch input on at least some areas of the display. For example, when a call is received, the processor 401 may determine whether a touch input on at least some areas of the display 411 is detected or not. When the touch input on the at least some areas of the display 411 is detected, the processor 401 may determine that the electronic device 400 is gripped by the user.

When the user's grip on the electronic device is not detected, the electronic device may provide the notification information corresponding to the notification event based on the notification mode of the electronic device in operation 1011. For example, when the user's grip on the electronic device is not detected in the sound output mode, the processor 401 may output a bell sound corresponding to the received call.

In operation 1007, when the user's grip on the electronic device is detected, the electronic device may identify a user's point of view. For example, when a touch input made on the edge of the display 411 by a user's hand or finger is detected, the processor 401 may identify the user's point of view through the camera module.

In operation 1009, the electronic device may determine whether the user is able to identify the notification information or not based on the user's point of view. For example, when the user's point of view is toward the display 411 of the electronic device 400, the processor 401 may determine that the user is able to identify the notification. In another example, when the user's point of view is not toward the display 411 of the electronic device 400, the processor 401 may determine that the user is not able to identify the notification. In another example, when the user's point of view cannot be identified, the processor 401 may determine that the user is not able to identify the notification.

In operation 1011, when the user's grip is not detected or when it is determined that the user is able to identify the notification, the electronic device may provide the notification corresponding to the notification event based on the notification mode of the electronic device. For example, when the call is received in the silent mode, the processor 401 may output light corresponding to the received call. In another example, when the call is received in the sound output mode, the processor 401 may output the bell sound corresponding to the received call.

In operation 1013, when it is determined that the user is not able to identify the notification, the electronic device may output a vibration corresponding to the notification information. For example, when the signal (for example, a call or a text message) is received in the sound output mode, the processor 401 may output a vibration corresponding to the received signal.

Figure 11:
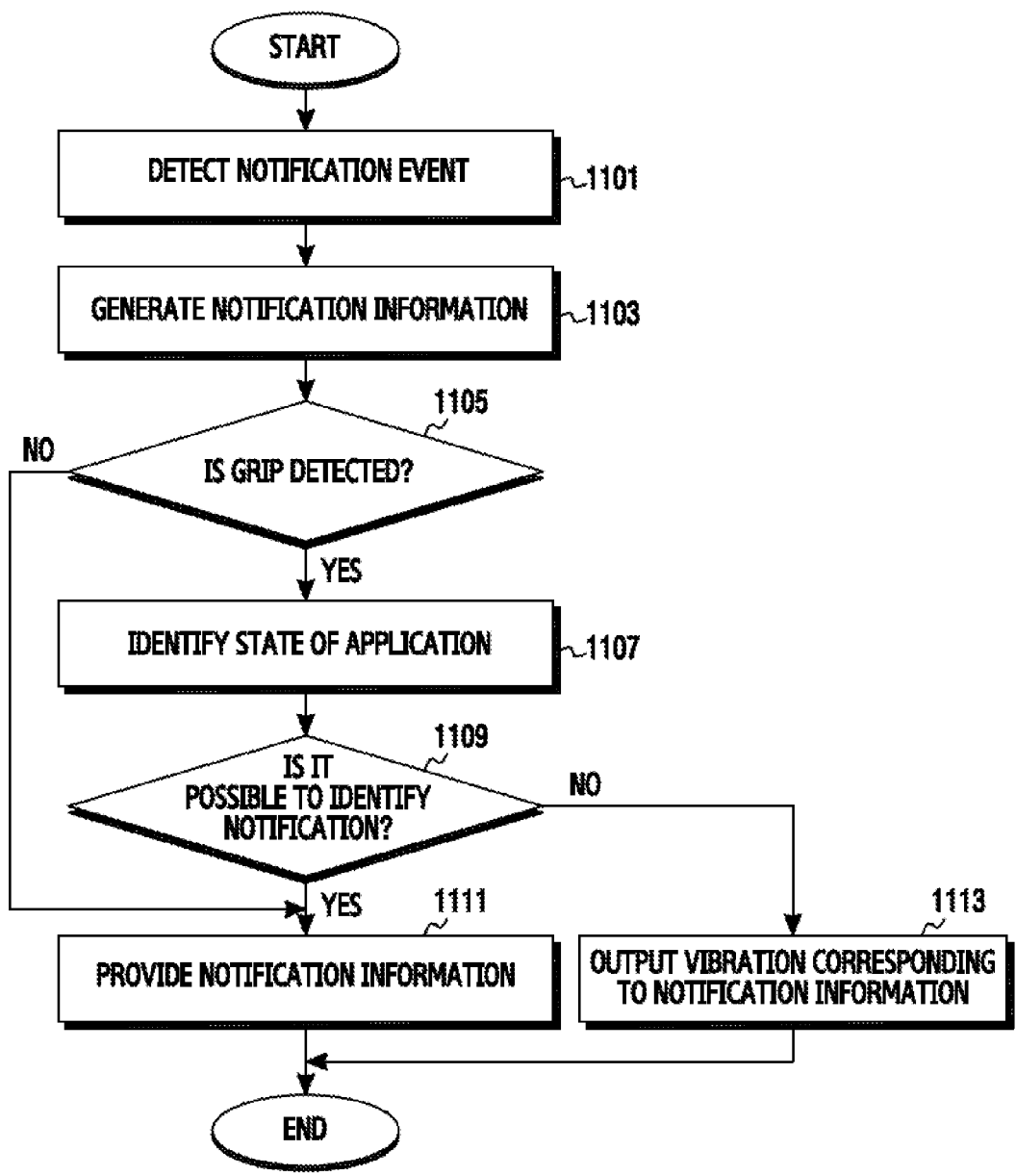
FIG. 11 illustrates a flowchart for providing notification information in an electronic device according to various exemplary embodiments of the present disclosure.

FIG. 11 illustrates a flowchart for providing notification information in an electronic device according to various exemplary embodiments of the present disclosure.

Referring to FIG. 11, in operation 1101, the electronic device (for example, the electronic device 101, 201, or 400 shown in FIG. 1 or 4) may detect a notification event according to driving of the electronic device. For example, the processor 401 may detect a notification event based on drive information of an application. For example, when a message is received in a social application which is being driven, the processor 401 may determine that the notification event occurs.

In operation 1103, the electronic device may generate notification information corresponding to the notification event based on a notification mode of the electronic device. For example, when the message is received through the social application which is being driven in a sound output mode, the processor 401 may extract a notification sound corresponding to the received message from the memory 407.

In operation 1105, the electronic device may detect a user's grip on the electronic device based on touch information on at least some areas of the display (for example, a touch screen). For example, when the message is received through the social application which is being driven, the processor 401 may determine whether a touch input on at least some areas of the display 411 is detected or not.

When the user's grip on the electronic device is not detected, the electronic device may provide the notification information corresponding to the notification event based on the notification mode of the electronic device in operation 1111. For example, when the message is received through the social application which is being driven in a silent mode, the processor 401 may output a notification screen corresponding to the received message.

In operation 1107, when the user's grip on the electronic device is detected, the electronic device may identify a state of an application which is being executed. For example, the processor 401 may determine whether at least one application which is being driven in the electronic device 400 is in a standby state or is performing an operation corresponding to a user's command (for example, a key button, a voice input, motion detection, or the like). Herein, the user's command may include a key input, a voice input, and an input generated by a motion.

In operation 1109, the electronic device may determine whether the user is able to identify the notification or not based on the state of the at least one application which is being driven in the electronic device. For example, when a user's key input to reply to the message received through the social application is detected, the processor 401 may determine that the user is able to identify the notification. In another example, when an application which is being driven in the electronic device 400 is in the standby state, the processor 401 may determine that the user is not able to identify the notification. In operation 1113, when it is determined that the user is not able to identify the notification, the electronic device may output a vibration corresponding to the notification information.

In operation 1111, when it is determined that the user is able to identify the notification, the electronic device may provide the notification information corresponding to the notification event based on the notification mode of the electronic device. For example, when the message is received through the social application in the sound output mode, the processor 401 may output a vibration corresponding to the message reception notification sound.

According to various embodiments of the present disclosure, the electronic device may determine whether the user is able to identify the notification by performing operation 1007 of identifying the user's point of view as shown in FIG. 10, and operation 1107 of identifying the state of the application as shown in FIG. 11, simultaneously. For example, when the user's point of view is identified through the camera module and then it is determined that the user does not see the display 411, the processor 411 may determine whether the user is able to identify the notification or not by determining the state of the application.

Figure 12:
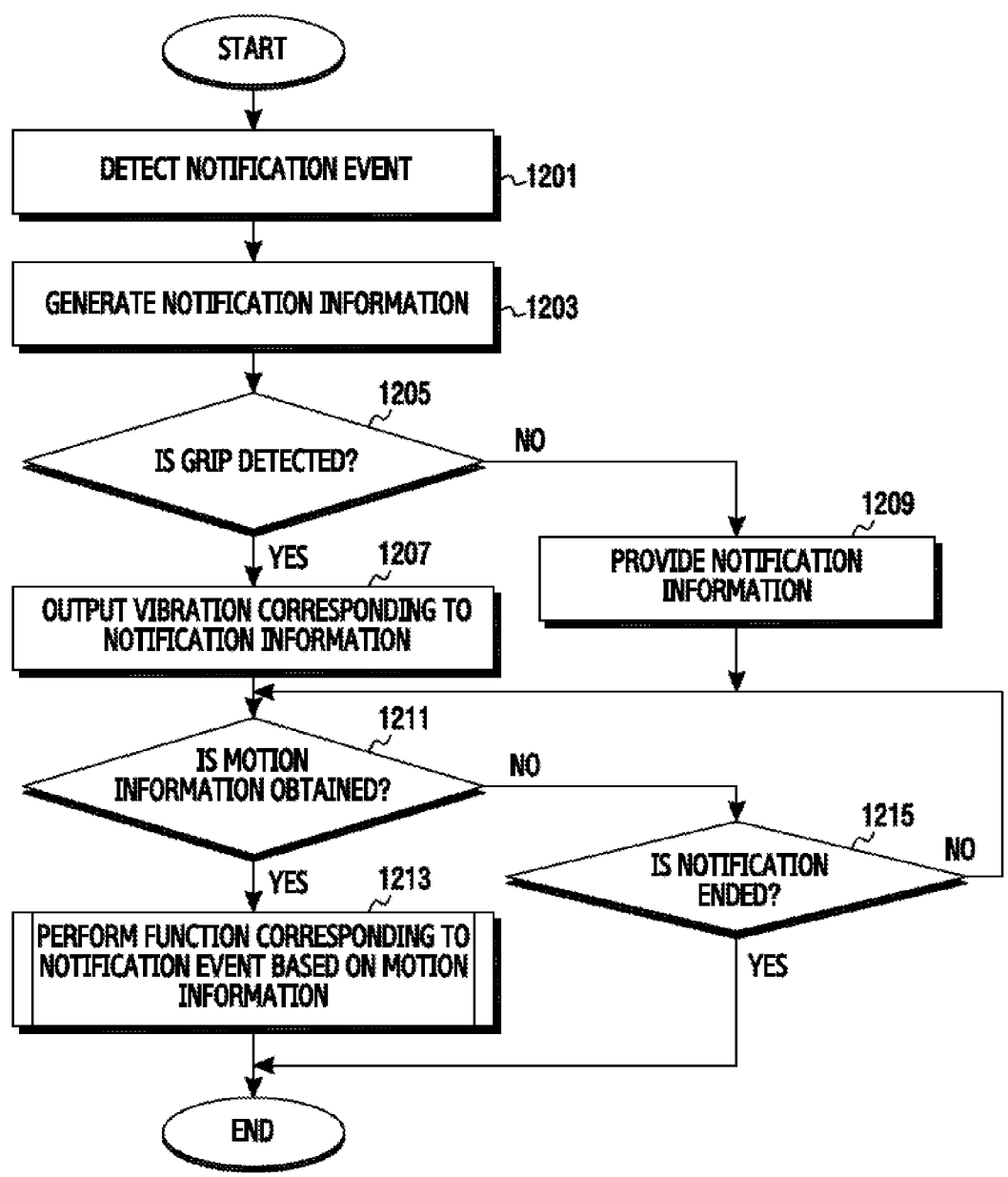
FIG. 12 illustrates a flowchart for performing a function corresponding to a notification event based on motion information when providing notification information in an electronic device according to various exemplary embodiments of the present disclosure.

FIG. 12 illustrates a flowchart for performing a function corresponding to motion information when providing notification information in an electronic device according to various exemplary embodiments of the present disclosure.

Referring to FIG. 12, in operation 1201, the electronic device (for example, the electronic device 101, 201, or 400 shown in FIG. 1 or 4) may detect a notification event according to driving of the electronic device. For example, when a signal is received from an external electronic device, the processor 401 may determine that the notification event occurs. For example, when a call is received from an external electronic device, the processor 401 may determine that the notification event occurs.

In operation 1203, the electronic device may generate notification information corresponding to the notification event based on a notification mode of the electronic device. For example, when the call is received from the external electronic device in a sound output mode, the processor 401 may output a bell sound corresponding to the received call.

In operation 1205, the electronic device may determine whether a user's grip on the electronic device is detected or not based on a touch input on at least some areas of the display (for example, a touch screen). For example, when a touch input on the edge area of the edge-panel display is detected, the processor 401 may determine that the electronic device 400 is gripped by the user.

In operation 1207, when the user's touch input on the electronic device is detected, the electronic device may output a vibration corresponding to the notification information. For example, when the touch input on the edge area of the edge-panel display is detected in the sound output mode, the processor 401 may output a vibration corresponding to the bell sound according to the received call.

In operation 1209, when the user's grip on the electronic device is not detected, the electronic device may provide the notification information corresponding to the notification event based on the notification mode of the electronic device. For example, when the touch input on the edge area of the edge-panel display is not detected in the sound output mode, the processor 401 may output the bell sound according to the received call.

In operation 1211, with reference to FIG. 4, the electronic device may determine whether motion information of the electronic device is acquired or not while providing the notification information. For example, the processor 401 may determine whether the electronic device 400 moves or not through the sensor module 405 (for example, an acceleration sensor) while outputting the bell sound according to the received call. In another example, the processor 401 may determine whether the electronic device 400 moves or not through the sensor module 405 while outputting the vibration corresponding to the bell sound according to the received call.

In operation 1213, when the electronic device acquires the motion information of the electronic device while providing the notification information, the electronic device may perform a function corresponding to the notification event based on the motion information. For example, when the electronic device acquires the motion information of the electronic device while providing the notification information, the processor 401 may automatically accept call connection based on the motion information. Additionally or alternatively, the processor 401 may additionally consider proximity information acquired through a proximity sensor and determine whether to accept the call connection or not. In another example, the processor 401 may automatically output a text message to the display 411 based on the motion information of the electronic device 400.

In operation 1215, when the motion information of the electronic device is not acquired while the notification information is being provided, the electronic device may determine whether the notification is ended or not. For example, the processor 401 may determine when the bell sound output is ended or not in response to the call connection request being ended in the sound output mode. In another example, the processor 401 may determine whether the vibration output corresponding to the text notification sound according to the received text message in the sound output mode is ended or not.

When the notification is not ended, the electronic device may acquire the motion information of the electronic device 400 again in operation 1211. For example, the processor 401 may continuously acquire the motion information while outputting the bell sound corresponding to the received call in the sound output mode.

Figure 13:
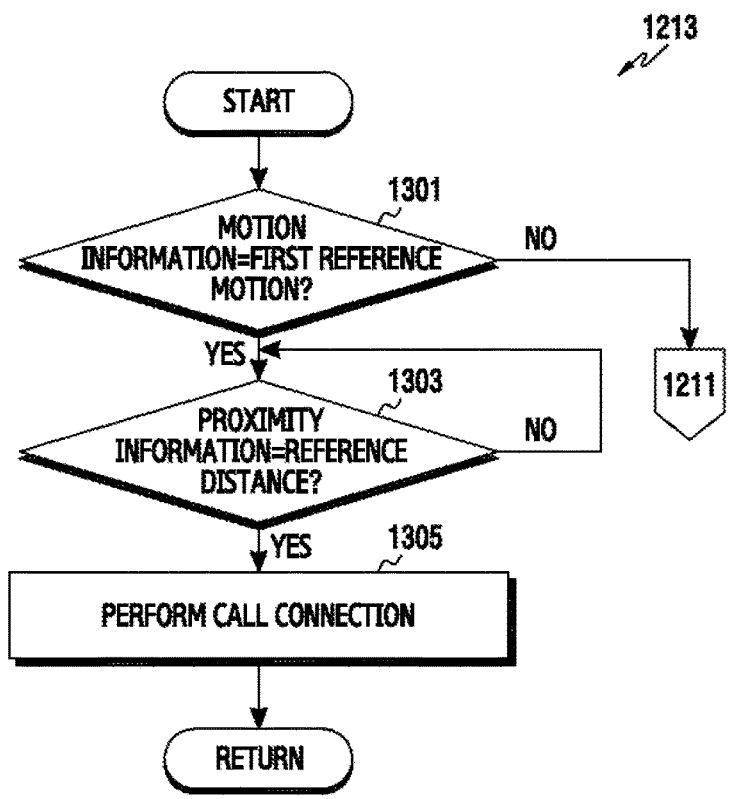
FIG. 13 illustrates a flowchart for performing a function corresponding to a notification event corresponding to a received call based motion information in an electronic device according to various exemplary embodiments of the present disclosure.

FIG. 13 illustrates a flowchart for performing a function corresponding to a received call based on motion information in an electronic device according to various exemplary embodiments of the present disclosure. Hereinafter, the operation of performing the function corresponding to the notification event based on the motion information in operation 1213 shown in FIG. 12 will be described with reference to FIG. 13.

Referring to FIG. 13, when the electronic device acquires the motion information of the electronic device (for example, operation 1211 shown in FIG. 12), the electronic device may determine whether the motion information satisfies a first predetermined reference motion or not in operation 1301. For example, the processor 401 may determine whether the motion of the electronic device 400 satisfies a motion of putting the electronic device 400 to user's ear to perform call connection based on the motion information. For example, when the motion of the electronic device does not satisfy the first reference motion, the processor 401 may perform operation 1211 shown in FIG. 12 of acquiring the motion information again. Herein, the first reference motion may be changed by the user.

In operation 1303, when the motion information of the electronic device satisfies the first reference motion, the electronic device may determine whether proximity information of the electronic device satisfies a predetermined reference distance. For example, when the user puts the electronic device 400 to user's ear to perform call connection, the processor 401 may determine whether a distance between the electronic device 400 and user's ear satisfies the predetermined reference distance or not. For example, when the distance between the electronic device 400 and user's ear does not satisfy the reference distance, the processor 401 may continuously perform operation 1303 of determining whether the proximity information of the electronic device 400 satisfies the reference distance until the notification is ended.

In operation 1305, when it is determined that the proximity information satisfies the reference distance, the electronic device may perform the call connection according to the received call. For example, when the distance to user's ear is shorter than the reference distance, the processor 401 may perform the call connection with another electronic device from which the call has been received.

Figure 14:
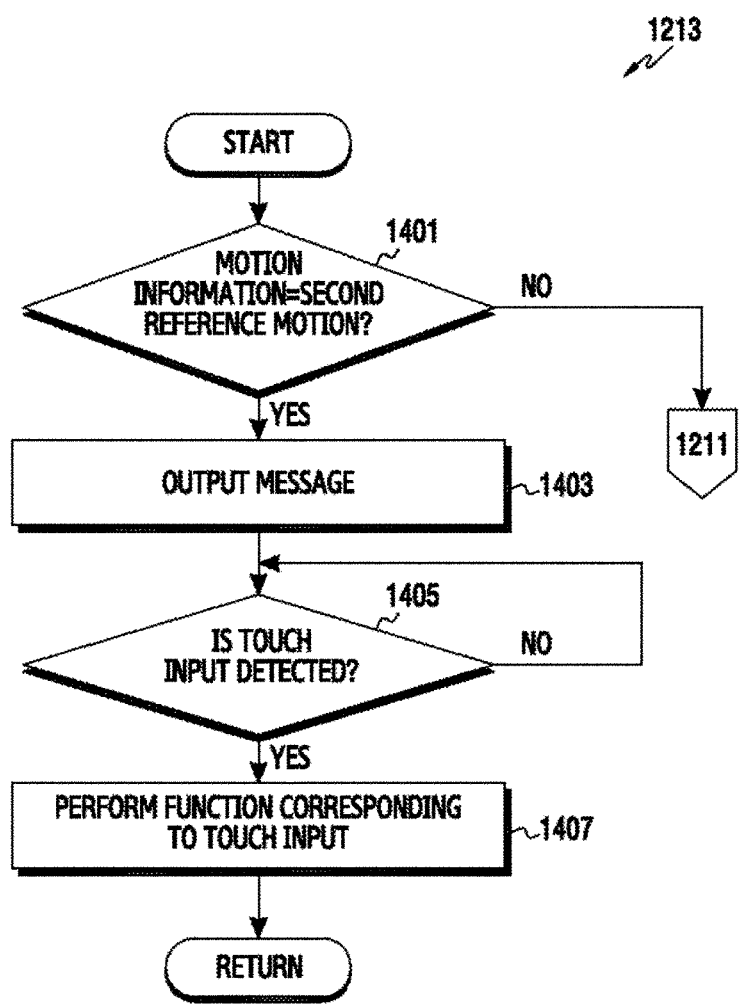
FIG. 14 illustrates a flowchart for performing a function corresponding to a received text message based motion information in an electronic device according to various exemplary embodiments of the present disclosure.

FIG. 14 illustrates a flowchart for performing a function corresponding to a received text message based on motion information in an electronic device according to various exemplary embodiments of the present disclosure. Hereinafter, the operation of performing the function corresponding to the notification event based on the motion information in operation 1213 shown in FIG. 12 will be described with reference to FIG. 15.

Referring to FIG. 14, in operation 1401, the electronic device (for example, the electronic device 101, 201, or 400 shown in FIG. 1 or 4) may determine whether the motion information of the electronic device satisfies a second predetermined reference motion or not. For example, the processor 401 may determine whether the user satisfies a motion for identifying the display 411 of the electronic device 400 based on the motion information of the electronic device 400 which is acquired in operation 1211 of FIG. 12. For example, when the motion information of the electronic device does not satisfy the second reference motion, the processor 401 may continuously perform operation 1211 of acquiring the motion information of the electronic device until the provision of the notification is ended.

In operation 1403, when the motion information satisfies the second reference motion, the electronic device may output a message. For example, when a motion for identifying the display 411 of the electronic device 400 is detected, the processor 401 may output a message content based on the received message to the display 411.

Figure 15:
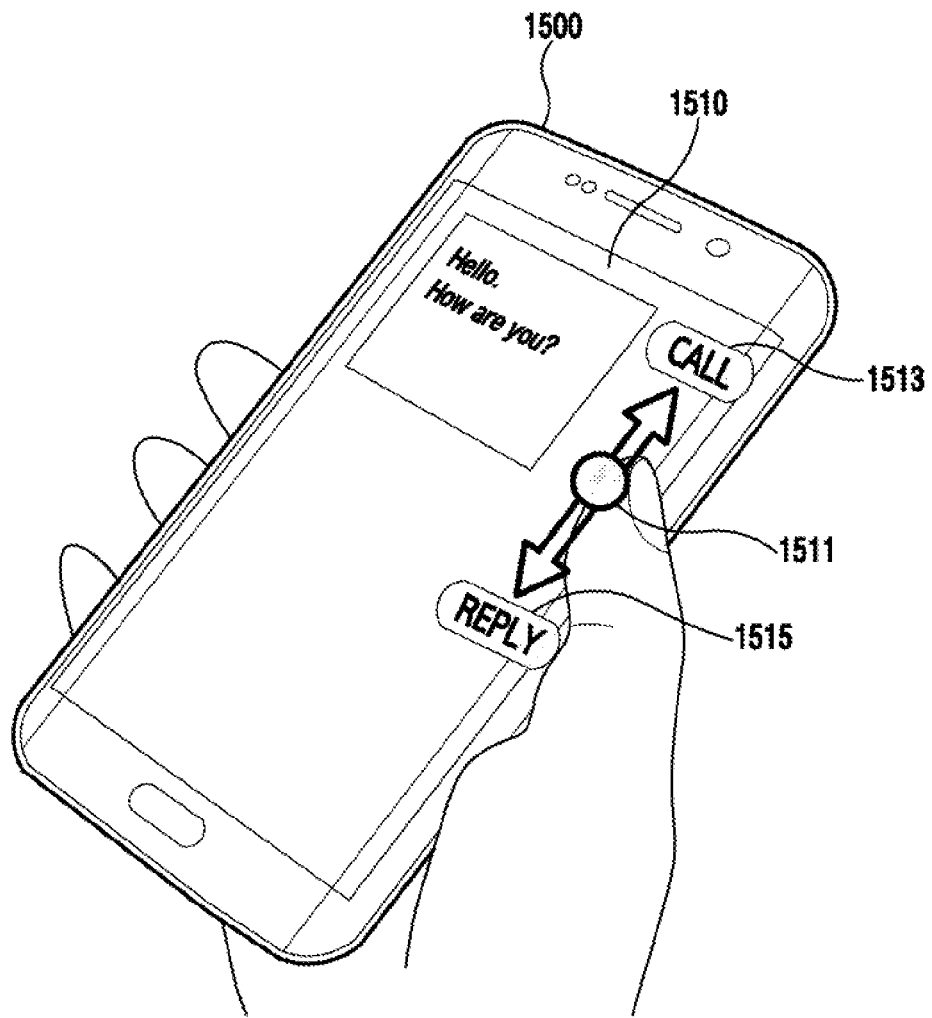
FIG. 15 illustrates a view showing a screen configuration which performs a function corresponding to a touch input when a message is outputted in an electronic device according to various exemplary embodiments of the present disclosure.

In operation 1405, the electronic device may determine whether a touch input on at least some areas of the display to which the message is outputted is detected or not. For example, as shown in FIG. 15, after outputting a message on a display 1510, an electronic device 1500 may determine whether a touch input 1511 on at least some areas of the display 1510 is detected or not.

In operation 1407, when the touch input on the at least some areas of the display is detected, the electronic device may perform a function corresponding to the touch input. For example, when the touch input 1511 on the at least some areas of the display 1510 is dragged upward as shown in FIG. 15, the electronic device 1500 may perform a telephone call connection function 1513. In another example, when the touch input 1511 on the at least some areas of the display 1510 is dragged downward, the electronic device 1500 may output a reply generation screen (e.g., function 1515) for the received text message.

Figure 16:
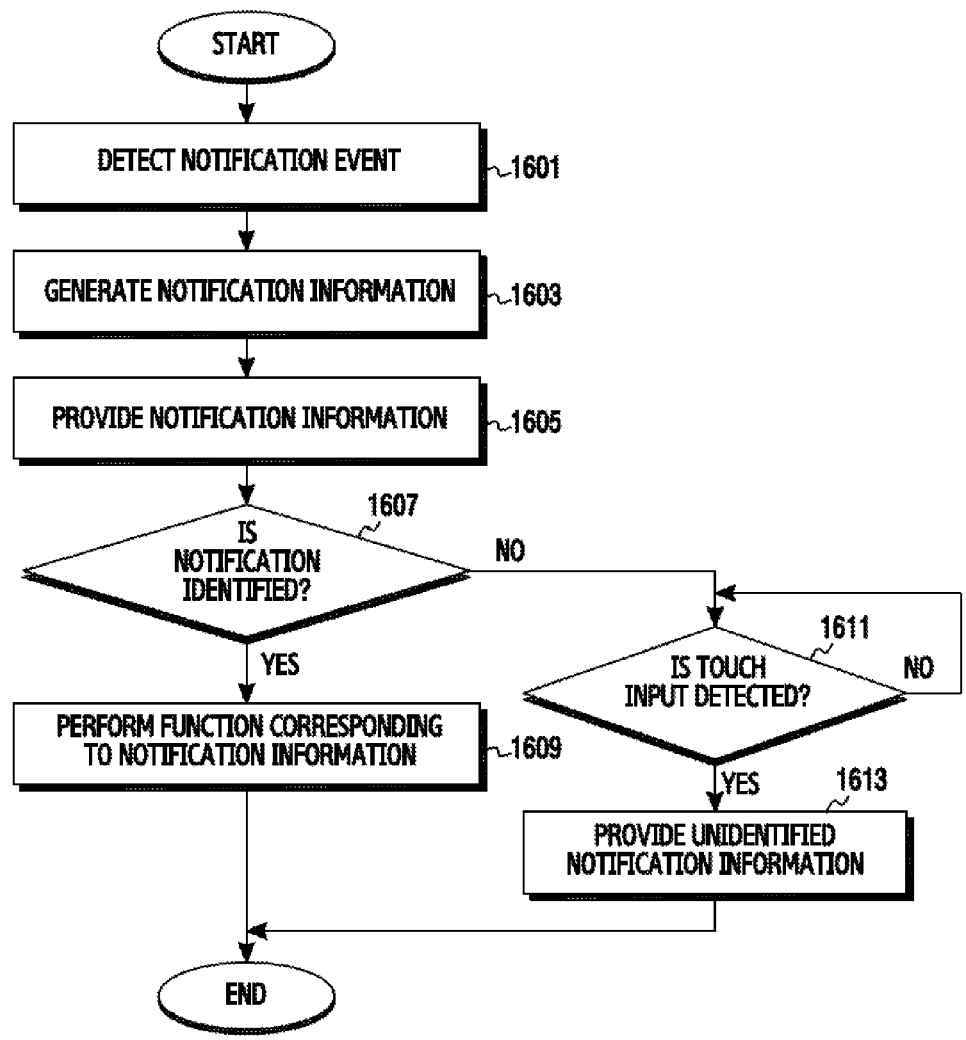
FIG. 16 illustrates a flowchart for providing unidentified notification information in an electronic device according to various exemplary embodiments of the present disclosure.

FIG. 16 illustrates a flowchart for providing unidentified notification in an electronic device according to various exemplary embodiment of the present disclosure. Hereinafter, the flowchart for providing the unidentified notification information in the electronic device will be described with reference to FIG. 17 and FIG. 18.

Referring to FIG. 16, in operation 1601, the electronic device (for example, the electronic device 101, 201, or 400 shown in FIG. 1 or 4) may detect a notification event according to driving of the electronic device. For example, when a call is received from an external electronic device, the processor 401 may determine that the notification event occurs. In another example, when a text message is received from an external electronic device, the processor 401 may determine that the notification event occurs.

In operation 1603, the electronic device may generate notification information corresponding to the notification event based on a notification mode of the electronic device. For example, when a call is received from an external electronic device in a sound output mode, the processor 401 may extract a bell sound corresponding to the received call from the memory 407. In another example, when a text message is received from an external electronic device in the sound output mode, the processor 401 may extract a text message notification sound corresponding to the received text from the memory 407.

In operation 1605, the electronic device may provide the notification information corresponding to the notification event based on the notification mode of the electronic device. For example, when the call is received from the external electronic device in the sound output mode, the processor 401 may output the bell sound corresponding to the received call. In another example, when the text message is received from the external electronic device in the sound output mode, the processor 401 may output the text message notification sound corresponding to the text message.

In operation 1607, the electronic device may determine whether the user identifies the notification information or not while providing the notification information corresponding the notification event based on the notification mode of the electronic device. For example, when a call button to perform call connection is inputted through the input module 409 (or the display 411) while the bell sound corresponding to the received call is being outputted in the sound output mode, the processor 401 may determine that the user has identified the notification information. In another example, when a user's gesture for identifying the text message is detected through the sensor module 405 while the notification sound corresponding to the received text message is being outputted in the sound output mode, the processor 401 may determine that the user has identified the notification.

In operation 1609, when the user has identified the notification information, the electronic device may perform a function corresponding to the notification event. For example, when the call button to perform call connection is inputted while the bell sound according to the received call is being outputted, the processor 401 may perform call connection. In another example, when the gesture for call connection is detected while a call reception screen according to the received call is being outputted, the processor 401 may perform call connection.

Figure 17:
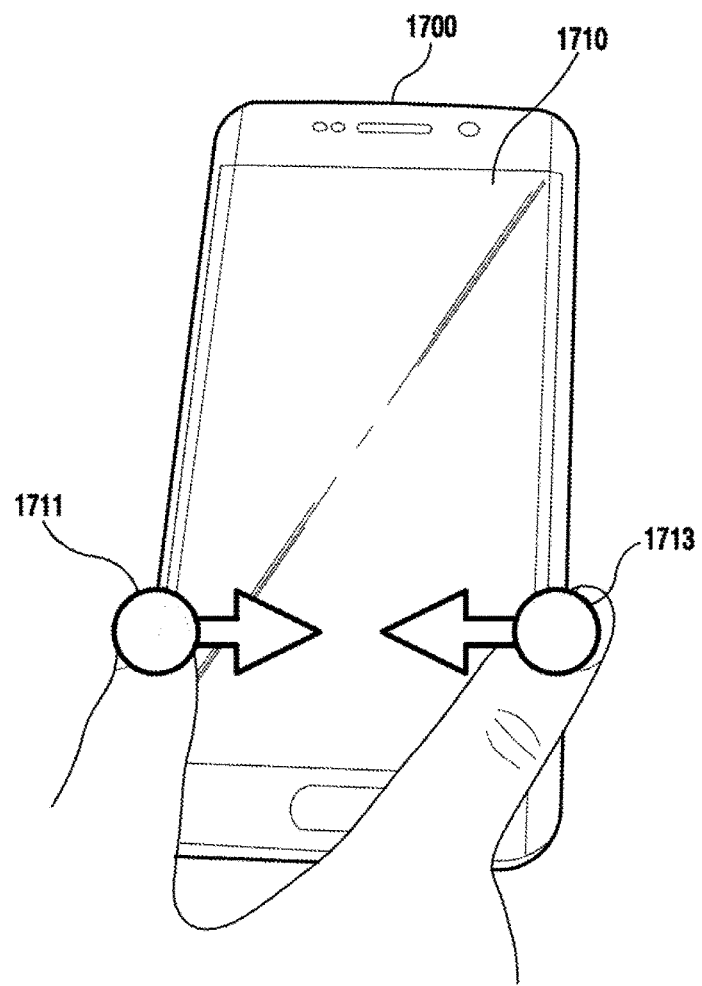
FIG. 17 illustrates a view showing a touch input for identifying an unidentified notification in an electronic device according to various exemplary embodiments of the present disclosure.

In operation 1611, when it is determined that the user does not identify the notification information while the notification information corresponding to the notification event is being provided based on the notification mode of the electronic device, the electronic device may determine whether a user's touch input to identify the unidentified notification information is detected or not through the display. For example, as shown in FIG. 17, after the bell sound corresponding to the received call is ended in the sound output mode, an electronic device 1700 may detect a user's first touch input 1711 and a user's second touch input 1713 for identifying the unidentified notification information on at least some areas of a display 1710. For example, when the display 1710 includes an edge-panel display, the at least some areas of the display 1710 may include an edge area.

When the user's touch input on the at least some areas of the display is not detected, the electronic device may perform the operation of determining whether the touch input is detected or not continuously or during a predetermined time.

Figure 18:
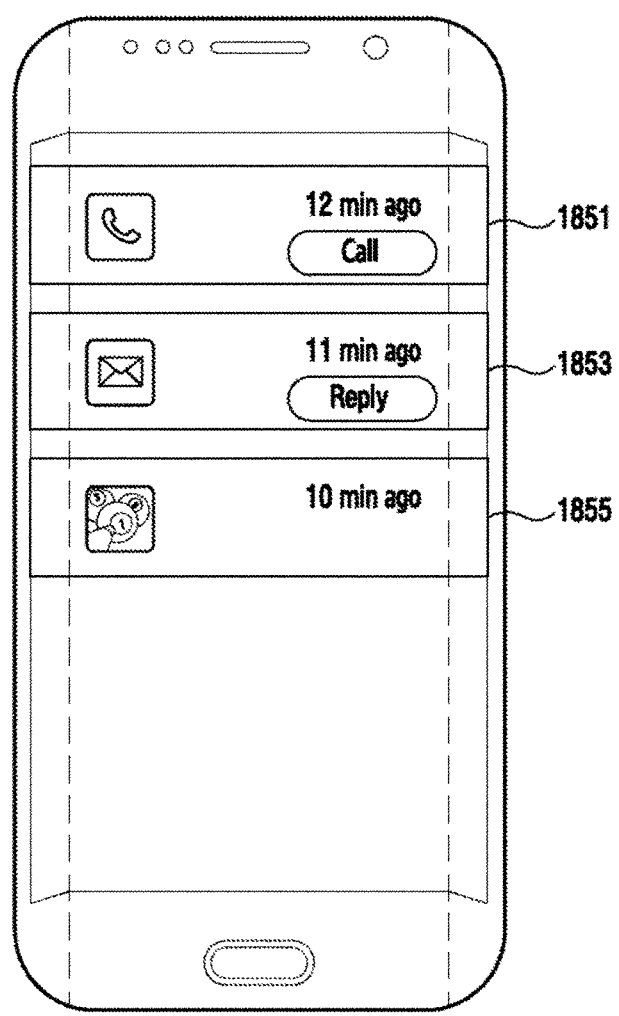
FIG. 18 illustrates a view showing a screen configuration which provides an unidentified notification in an electronic device according to various exemplary embodiments of the present disclosure.

In operation 1613, when the user's touch input for identifying the unidentified notification information is detected on the at least some areas of the display, the electronic device may provide the unidentified notification information. For example, when the user's touch input for identifying the unidentified notification information is detected, the processor 401 may output the unidentified notification information through the display 411. For example, when there is a plurality of pieces of unidentified notification information, the processor 401 may output the unidentified notification information through the display 411 based on predetermined priority based on the user's touch input for identifying the unidentified notification information. For example, when there are call connection notification information 1851, text message notification information 1853, and application notification information 1855 as the unidentified notification information as shown in FIG. 18, the processor 401 may output the call connection notification information 1851 which is set as having a first priority on the upper end of the display 411 in response to the user's touch input for identifying the unidentified notification information. In another example, the processor 401 may output the text message notification information 1853 which is set as having a second priority under the call connection notification information 1851. In another example, the processor 401 may output the application notification information 1855 which is set as having a third priority under the text message notification information 1853. For example, the priority of the notification information may be fixed or may be updated according to the number of times of execution, a point of time of execution, an execution time, or the like.

According to various embodiments of the present disclosure, an operation method of an electronic device may include: detecting occurrence of an event from a signal received from an external electronic device or an operation of the electronic device; generating a notification based on at least part of the event; detecting whether at least some areas of a touch screen functionally connected with the electronic device are touched by a user's hand or finger; and, when the at least some areas of the touch screen are touched by the user's hand or finger, activating an electric motor functionally connected with the electronic device.

According to various embodiments of the present disclosure, the generating the notification based on the at least part of the event may include activating the electric motor related to the notification immediately after generating the notification.

According to various embodiments of the present disclosure, the activating the electric motor may include: when the at least some areas of the touch screen are not touched by the user's hand or finger, outputting the notification; and, when the at least some areas of the touch screen are touched by the user's hand or finger while the notification is being outputted, activating the electric motor.

According to various embodiments of the present disclosure, the activating the electric motor may include, when the touch made by the user's hand or finger on the at least some areas of the touch screen is held during a reference time, activating the electric motor.

According to various embodiments of the present disclosure, the activating the electric motor may include: when the at least some areas of the touch screen are touched by the user's hand or finger, determining whether it is possible to identify the notification based on a user's point of view; and, when it is determined that it is possible to identify the notification, activating the electric motor.

According to various embodiments of the present disclosure, the activating the electric motor may include, when the at least some areas of the touch screen are touched by the user's hand or finger, determining whether it is possible to identify the notification based on a state of at least one application which is being driven in the electronic device; and, when it is determined that it is possible to identify the notification, activating the electric motor.

According to various embodiments of the present disclosure, the detecting whether the at least some areas of the touch screen are touched by the user's hand or finger may include continuously determining whether the touch made on the at least some areas of the touch screen by the user's hand or finger is detected or not.

According to various embodiments of the present disclosure, the operation method may further include: when the electric motor is activated, detecting motion information of the electronic device; and performing a function corresponding to the occurrence of the event based on the motion information.

According to various embodiments of the present disclosure, an operation method of an electronic device may include: detecting occurrence of an event from a signal received from an external electronic device or an operation of the electronic device; generating a notification based on at least part of the event; continuously detecting whether at least some areas of a touch screen functionally connected with the electronic device are touched by a user's hand or finger; and, when the at least some areas of the touch screen are touched by the user's hand or finger, activating an electric motor functionally connected with the electronic device.

The term "module" used in the various embodiments of the present disclosure refers to a unit including one of hardware, software, and firmware, or a combination of two or more of them, for example. For example, the "module" may be used interchangeably with terms "unit," "logic," "logical block," "component" or "circuit." The "module" may be a minimum unit of an integrally configured component or a part of it. The "module" may be a minimum unit that performs one or more functions or a part of it. The "module" may be implemented mechanically or electronically. For example, the "module" according to various embodiments of the present disclosure may include at least one of an application-specific integrated circuit (ASIC) chip, field-programmable gate arrays (FPGAs), and a programmable logic device, which perform any operation that is already well known or will be developed in the future.

At least part of the apparatus (for example: modules or functions thereof) or method (for example: operations) according to various embodiments of the present disclosure may be implemented by using instructions stored in computer-readable storage media in the form of a programming module. When the instructions are executed by one or more processors (e.g., the processor 120 shown in FIG. 1), the one or more processors may perform a function corresponding to the instructions. The computer-readable storage media may be the memory 120, for example.

Examples of the computer-readable recording media include hard disks, floppy disks and magnetic media (for example, magnetic tapes), optical media (for example, a compact disc read only memory (CD-ROM) and a DVD, magneto-optical media (for example, floptical disks)), and hardware devices (for example, a read only memory (ROM), a random access memory (RAM) and a flash memory). Examples of the program commands include machine language codes created by a compiler, and high-level language codes that can be executed by a computer by using an interpreter. The above-described hardware devices may be configured to operate as one or more software modules for performing operations of the present disclosure, and vice versa.

A module or programming module according to the various embodiments of the present disclosure may include one or more of the above-described elements, may omit some elements, or may further include additional elements. The operations performed by the module, the programming module, or the other elements according to the various embodiments of the present disclosure may be performed serially, in parallel, repeatedly, or heuristically. In addition, some operations may be performed in different order or may be omitted, and an additional operation may be added.

According to various embodiments, the electronic device and the method selectively provides notification information using a vibration according to whether the user grips the electronic device or not, so that the user can easily recognize the notification information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a housing;
   a touch screen exposed through a part of the housing;
   a communication circuit disposed inside the housing;
   an electric motor disposed inside the housing;
   at least one processor electrically coupled to the touch screen, the communication circuit, and the electric motor; and
   a memory electrically coupled to the at least one processor,
   wherein the memory stores instructions to be executed by the at least one processor, and
   wherein the at least one processor is configured to control for:
      detecting occurrence of an event from a signal received through the communication circuit or from an operation of the electronic device,
      generating a notification based on at least part of the event,
      detecting whether at least some areas of the touch screen are touched by a user's hand or finger using the touch screen,
      when the at least some areas of the touch screen are touched by the user's hand or finger, activating the electric motor,
      when the electric motor is activated, detecting motion information of the electronic device, and
      performing a function corresponding to the occurrence of the event based on the motion information.

2. The electronic device of claim 1, wherein the at least one processor is further configured to control for activating the electric motor related to the notification immediately after generating the notification.

3. The electronic device of claim 1, wherein the at least one processor is further configured to control for:
   when the at least some areas of the touch screen are not touched by the user's hand or finger, outputting the notification, and
   when a touch input made by the user's hand or finger is detected while the notification is being outputted, activating the electric motor.

4. The electronic device of claim 1, wherein the at least one processor is further configured to control for:
   when the touch made by the user's hand or finger on the at least some areas of the touch screen is held during a reference time, activating the electric motor.

5. The electronic device of claim 1, wherein the at least one processor is further configured to control for:
   when the at least some areas of the touch screen are touched by the user's hand or finger, determining whether it is possible to identify the notification based on a user's point of view, and
   when it is determined that it is not possible to identify the notification, activating the electric motor.

6. The electronic device of claim 1, wherein the at least one processor is further configured to control for:
   when the at least some areas of the touch screen are touched by the user's hand or finger, determining whether it is possible to identify the notification based on a state of at least one application which is being executed in the electronic device, and
   when it is determined that it is possible to identify the notification, activating the electric motor.

7. The electronic device of claim 1, wherein the touch screen is configured to continuously determine whether the touch made by the user's hand or finger is detected or not.

8. An electronic device comprising:
   a housing;
   a touch screen exposed through a part of the housing and having at least some areas thereof continuously activated to recognize a touch;
   a communication circuit disposed inside the housing;
   an electric motor disposed inside the housing;
   at least one processor electrically connected to the touch screen, the communication circuit, and the electric motor; and
   a memory electrically coupled to the at least one processor,
   wherein the memory stores instructions to be executed by the at least one processor, and
   wherein the at least one processor is configured to control for:
      detecting occurrence of an event from a signal received through the communication circuit or from an operation of the electronic device,
      generating a notification based on at least part of the event,
      detecting whether at least some areas of the touch screen are touched by a user's hand or finger using the touch screen, when the at least some areas of the touch screen are touched by the user's hand or finger, activating the electric motor, when the electric motor is activated, detecting motion information of the electronic device, and performing a function corresponding to the occurrence of the event based on the motion information.

9. An operation method of an electronic device, the operation method comprising:

detecting occurrence of an event from a signal received from an external electronic device or an from operation of the electronic device;

generating a notification based on at least part of the event;

detecting whether at least some areas of a touch screen functionally connected with the electronic device are touched by a user's hand or finger;

when the at least some areas of the touch screen are touched by the user's hand or finger, activating an electric motor functionally connected with the electronic device;

when the electric motor is activated, detecting motion information of the electronic device; and performing a function corresponding to the occurrence of the event based on the motion information.

10. The operation method of claim 9, wherein the generating of the notification based on the at least part of the event comprises activating the electric motor related to the notification immediately after generating the notification.

11. The operation method of claim 9, wherein the activating of the electric motor comprises:

when the at least some areas of the touch screen are not touched by the user's hand or finger, outputting the notification; and when the at least some areas of the touch screen are touched by the user's hand or finger while the notification is being outputted, activating the electric motor.

12. The operation method of claim 9, wherein the activating of the electric motor comprises, when the touch made by the user's hand or finger on the at least some areas of the touch screen is held during a reference time, activating the electric motor.

13. The operation method of claim 9, wherein the activating of the electric motor comprises:

when the at least some areas of the touch screen are touched by the user's hand or finger, determining whether it is possible to identify the notification based on a user's point of view; and when it is determined that it is not possible to identify the notification, activating the electric motor.

14. The operation method of claim 9, wherein the activating of the electric motor comprises:

when the at least some areas of the touch screen are touched by the user's hand or finger, determining whether it is possible to identify the notification based on a state of at least one application which is being executed in the electronic device; and when it is determined that it is possible to identify the notification, activating the electric motor.

15. The operation method of claim 9, wherein the detecting of whether the at least some areas of the touch screen are touched by the user's hand or finger comprises continuously determining whether the touch made on the at least some areas of the touch screen by the user's hand or finger is detected or not.

* * * * *